(12) United States Patent
Østergaard et al.

(10) Patent No.: US 9,176,342 B2
(45) Date of Patent: *Nov. 3, 2015

(54) RADIATION EMITTING ELEMENT AND A METHOD OF PROVIDING IT

(71) Applicants: Jens Wagenblast Stubbe Østergaard, Roskilde (DK); Niels Agersnap Larsen, Kgs. Lyngby (DK)

(72) Inventors: Jens Wagenblast Stubbe Østergaard, Roskilde (DK); Niels Agersnap Larsen, Kgs. Lyngby (DK)

(73) Assignee: Blackbrite APS, Roskilde (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,669

(22) Filed: Sep. 26, 2013

(65) Prior Publication Data

US 2014/0092345 A1 Apr. 3, 2014

Related U.S. Application Data

(63) Continuation of application No. 12/998,589, filed as application No. PCT/EP2009/064753 on Nov. 6, 2009, now Pat. No. 8,559,095.

(30) Foreign Application Priority Data

Nov. 6, 2008 (DK) .................................. 2008 01530

(51) Int. Cl.
  *G02B 26/00* (2006.01)
  *G02F 1/1335* (2006.01)
  (Continued)

(52) U.S. Cl.
  CPC .......... *G02F 1/133605* (2013.01); *G02B 6/001* (2013.01); *G02B 6/3538* (2013.01); *G02B 26/005* (2013.01); *Y10T 29/49002* (2015.01)

(58) Field of Classification Search
  CPC ..................................................... G02B 26/005
  USPC .................................................. 359/290, 291
  See application file for complete search history.

(56) References Cited

U.S. PATENT DOCUMENTS 6,449,081 B1 9/2002 Onuki et al.
7,123,796 B2 10/2006 Steckl et al.
(Continued)

FOREIGN PATENT DOCUMENTS

EP         1069450 A2     1/2001
WO    WO-2005-096029 A1  10/2005
(Continued)

OTHER PUBLICATIONS

International Search Report for PCT/EP2009/064753 dated Feb. 19, 2010.

*Primary Examiner* — James Jones
(74) *Attorney, Agent, or Firm* — Harness, Dickey & Pierce, P.L.C.

(57) ABSTRACT

A radiation emitting element comprising a radiation transmissive element having a first refractive index, a first surface, a second, opposite surface, a radiation emitter adapted to emit radiation of a predetermined wavelength into the radiation transmissive element, and a plurality of radiation controlling elements, wherein each radiation controlling element comprises: a first liquid having a second refractive index, a second fluid having a third refractive index being lower than the second refractive index, the second refractive index being closer to the first refractive index than the third refractive index, means for altering a shape of the first liquid between two modes wherein: • in a first mode, the first liquid being in contact with the first surface at a first surface part, and an interface between the first liquid and the second fluid, at the first surface part, is not parallel to the first surface part and • in a second mode, a surface of the second fluid, at the first surface part, is at least substantially parallel to the shape of the first surface part, wherein the first liquid has a transmittance of at least 10% at the predetermined wavelength.

30 Claims, 30 Drawing Sheets

(51) Int. Cl.
*F21V 8/00* (2006.01)
*G02B 6/35* (2006.01)

(56) References Cited

U.S. PATENT DOCUMENTS 8,559,095 B2 * 10/2013 Ostergaard et al. ............ 359/290

2007/0031097 A1 2/2007 Heikenfeld et al.
2008/0247019 A1 10/2008 Kuiper et al.
2008/0297880 A1 12/2008 Steckl et al.

FOREIGN PATENT DOCUMENTS

WO WO-2006-017129 A2 2/2006
WO WO-2006-126129 A2 11/2006

* cited by examiner

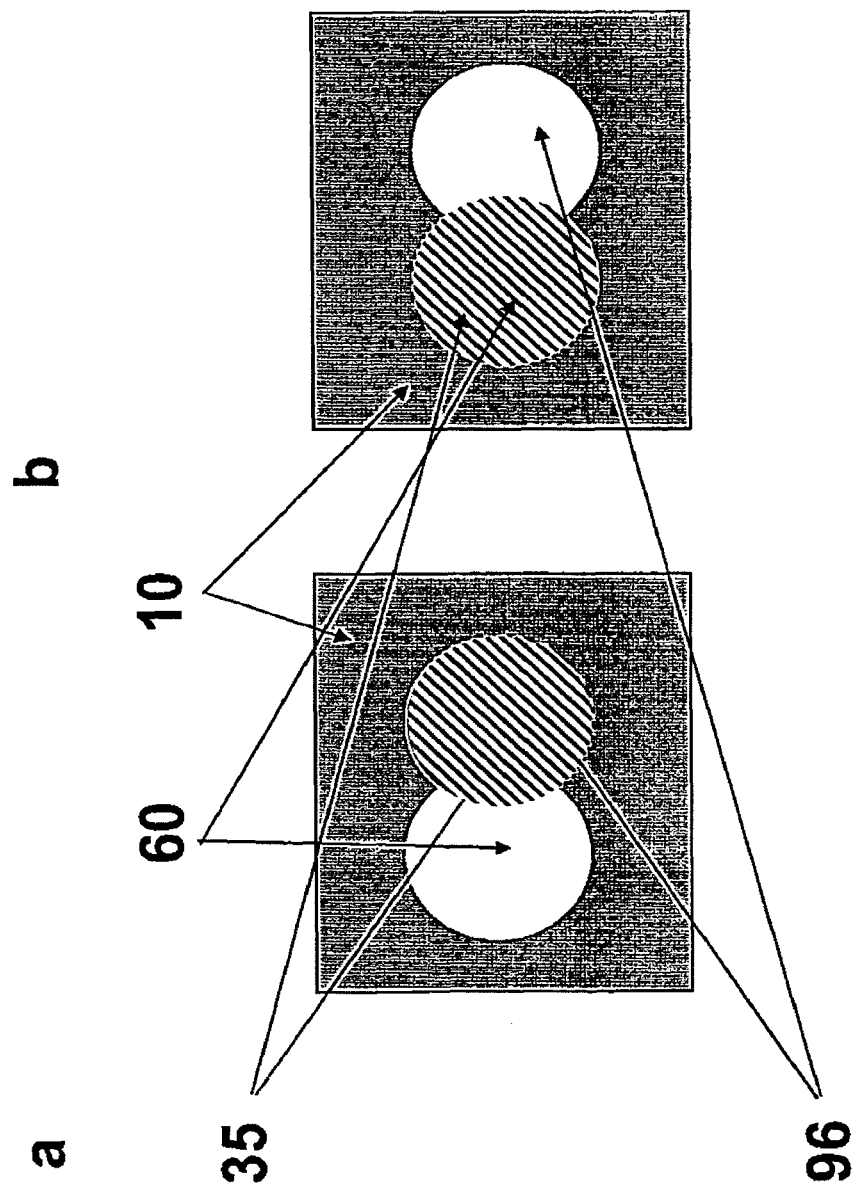
Fig. 13.1

Fig. 20.1
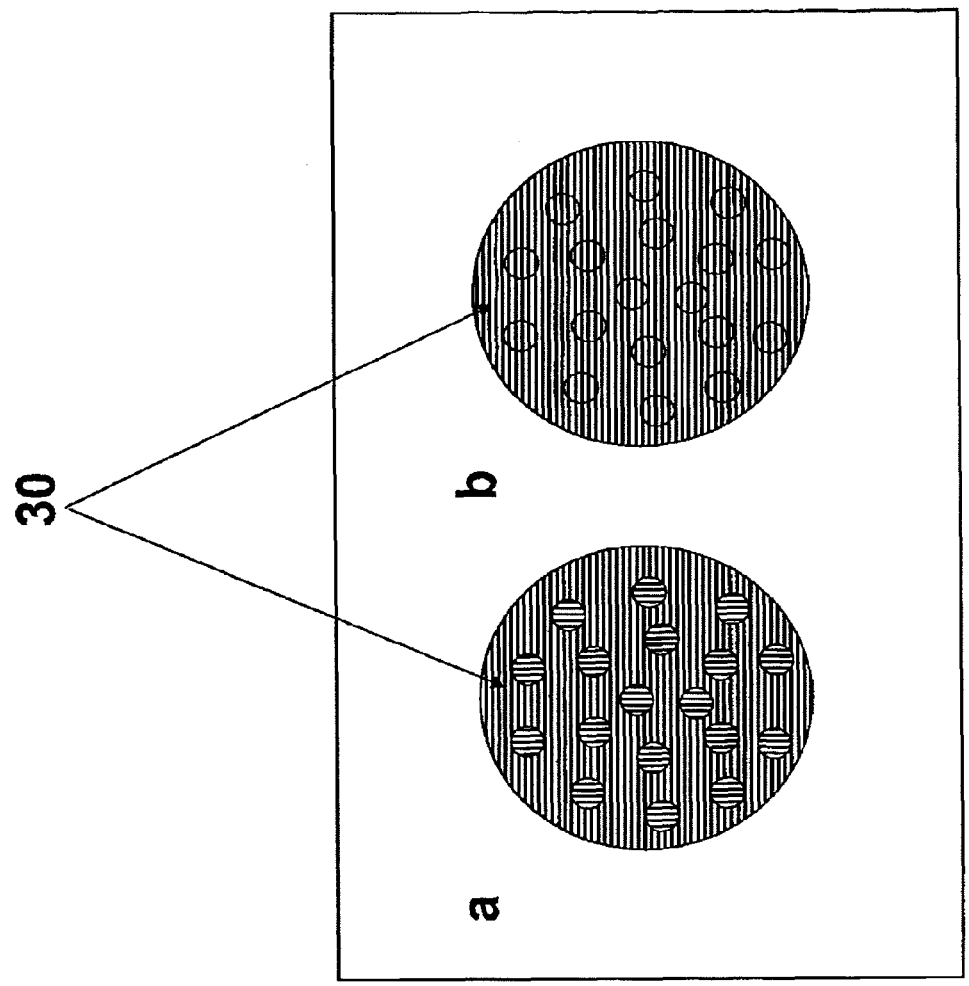

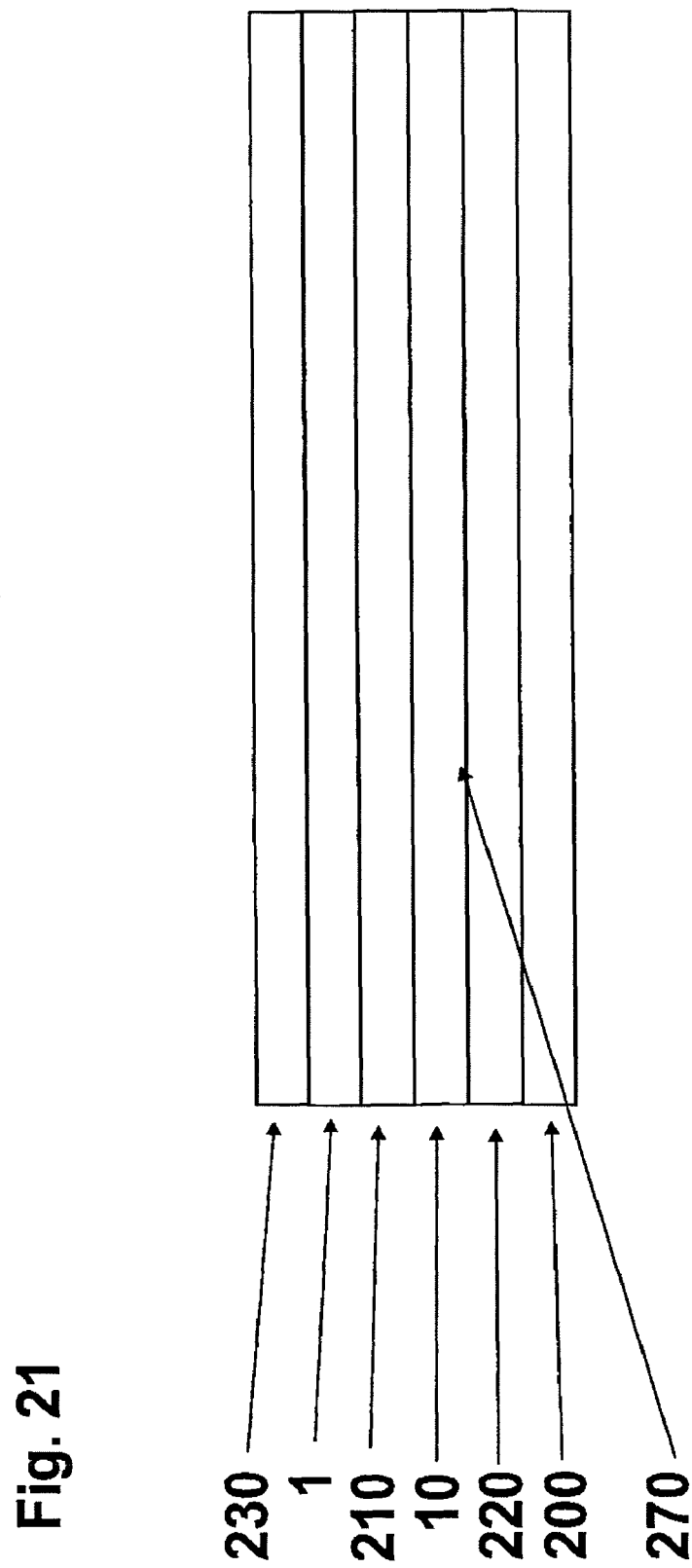

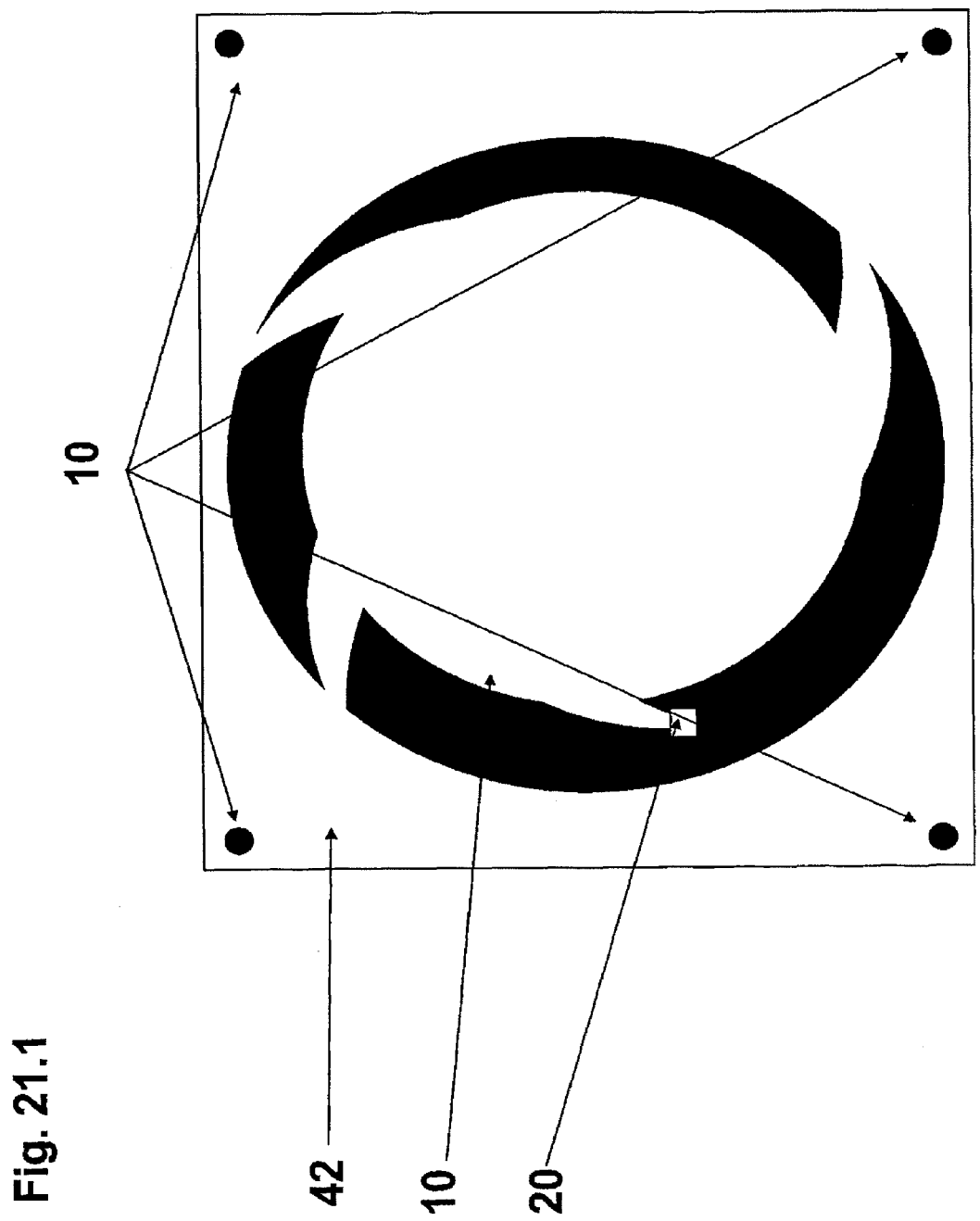
Fig. 21.1

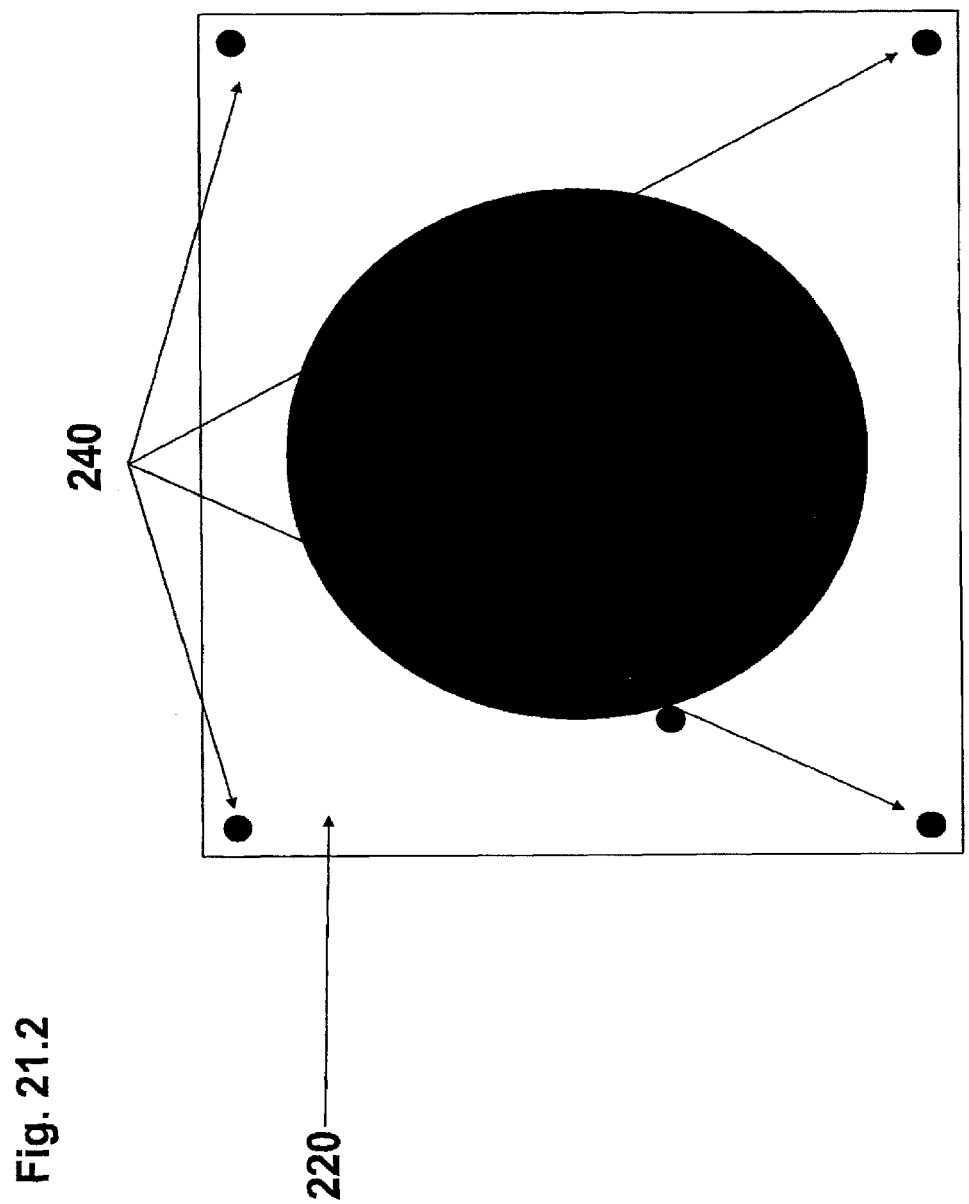
Fig. 21.2

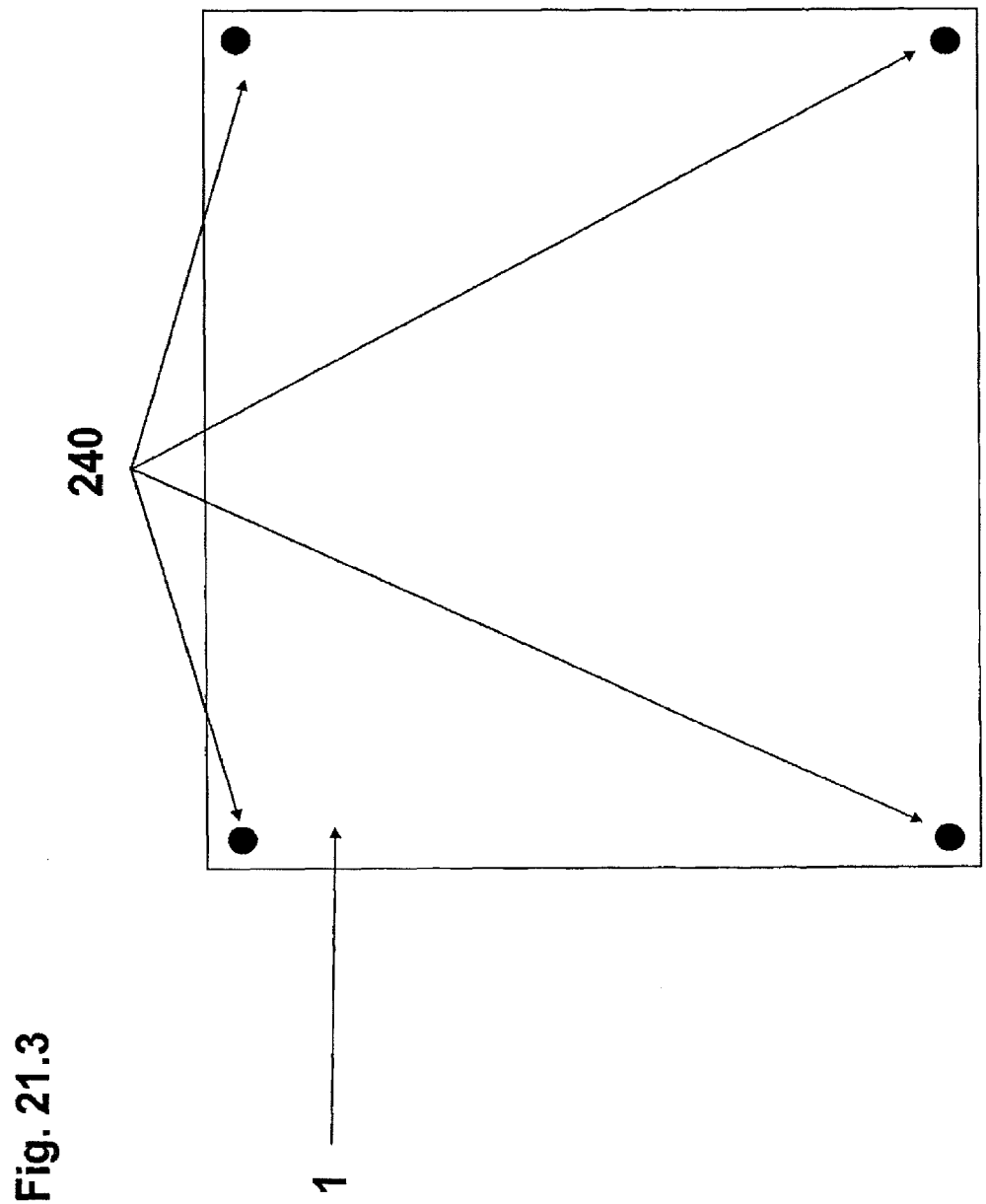
Fig. 21.3

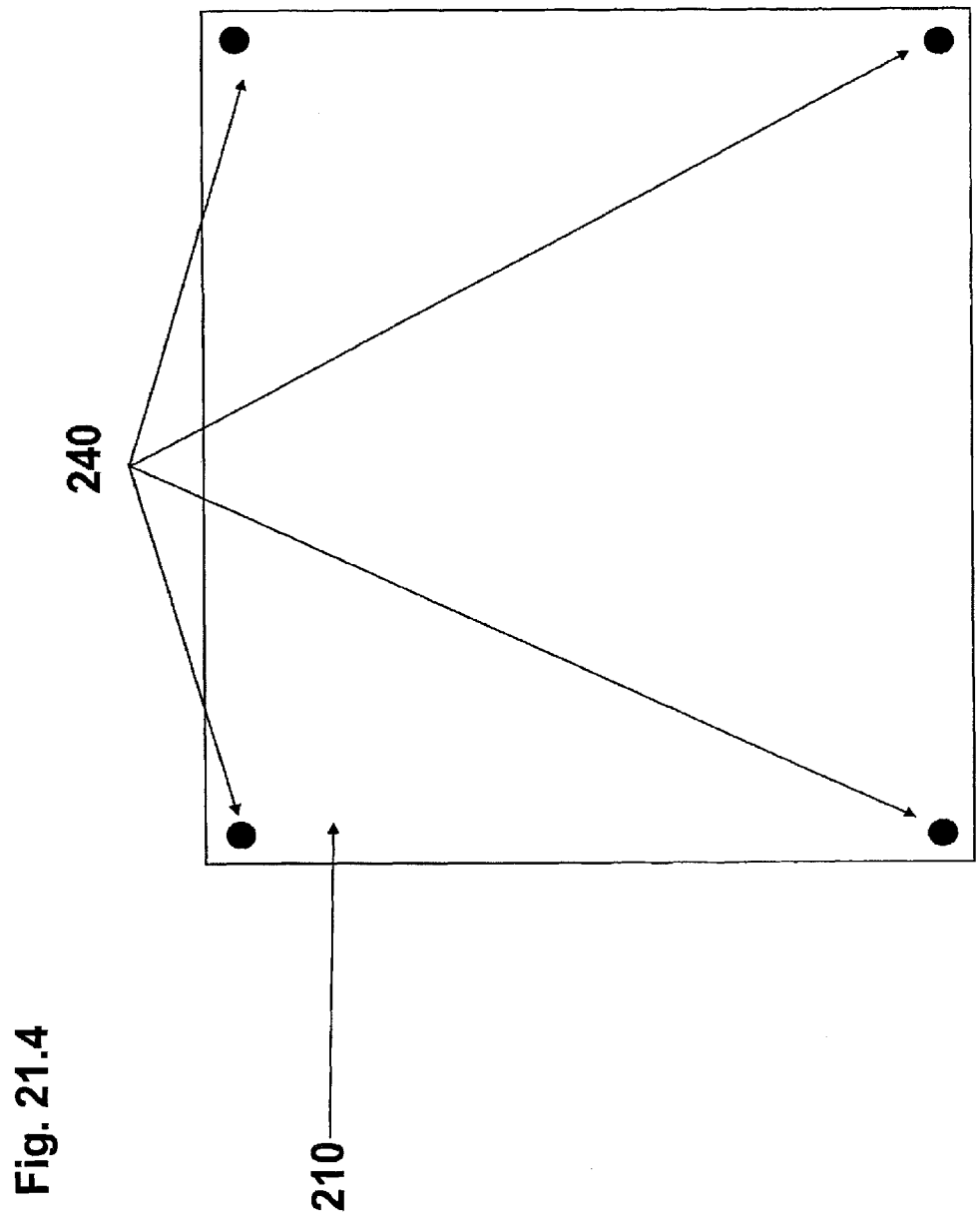
Fig. 21.4

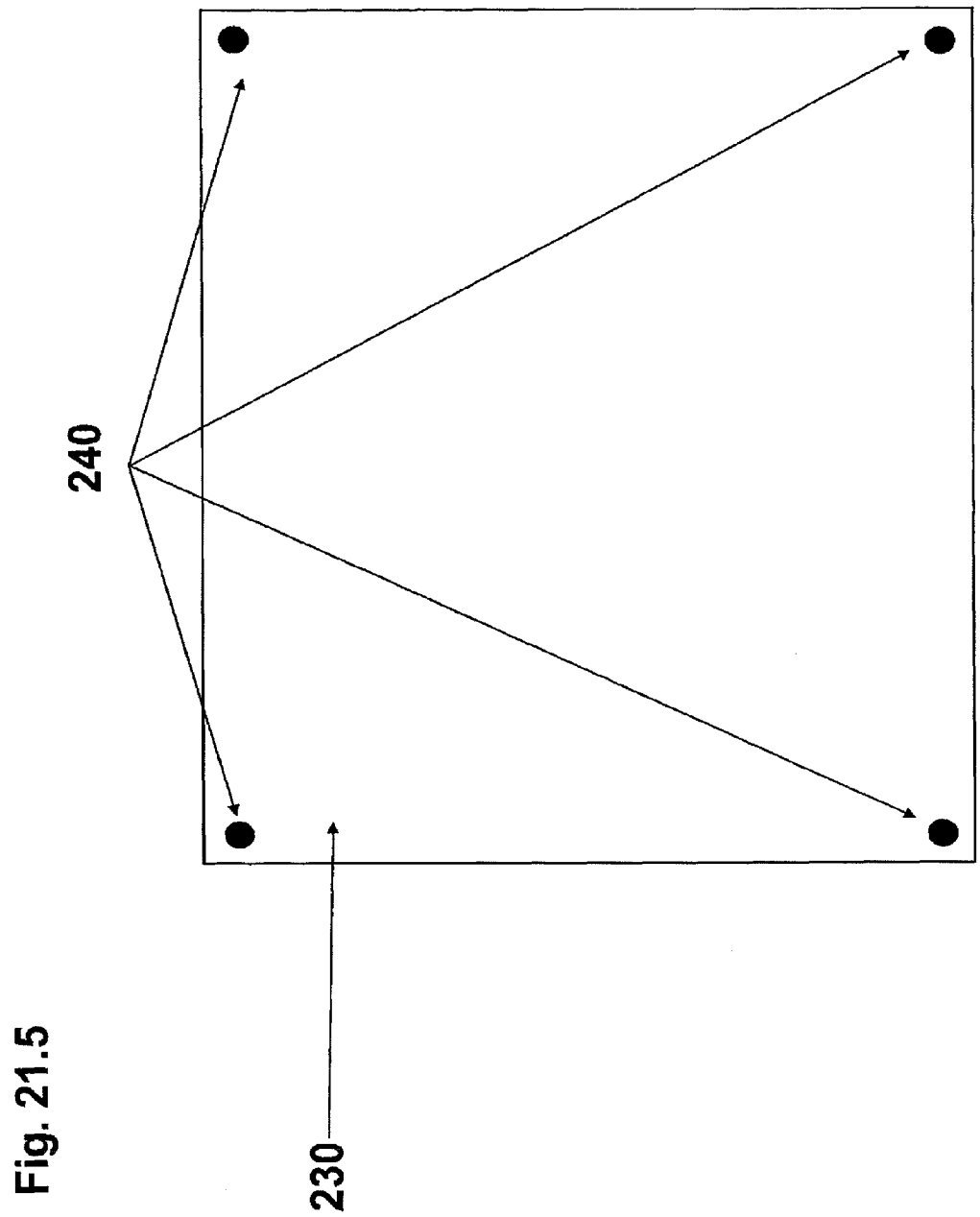
Fig. 21.5

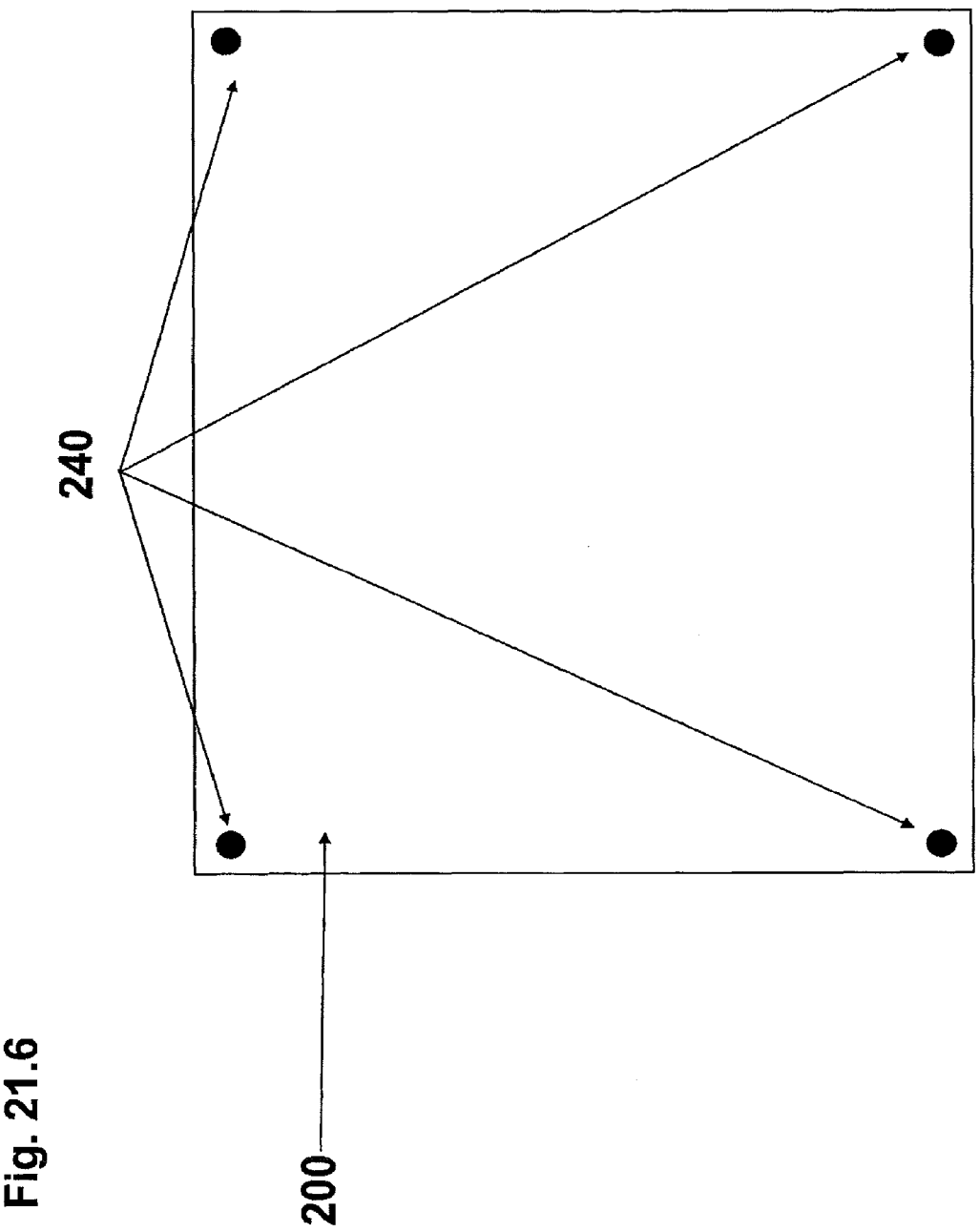
Fig. 21.6

RADIATION EMITTING ELEMENT AND A METHOD OF PROVIDING IT

CROSS-REFERENCE TO RELATED APPLICATION(S)

This application is a continuation of and claims priority under 35 U.S.C. §120 to U.S. patent application Ser. No. 12/998,589, filed on May 5, 2011, in the U.S. Patent and Trademark Office, which is a national stage entry of International Application No. PCT/EP2009/064753, filed on Nov. 6, 2009, and claims the benefit of Danish Patent Application No. PA 2008-01530, filed on Nov. 6, 2008. The entire contents of each of the above applications are incorporated herein by reference in their entirety.

The present invention relates to improvements in lighting or display technologies and in particular to a competitive electrowetting lightgate in which oil or other viscous liquid is moved by an electrical field between two positions, thereby affecting the course of light therein. This may be used for providing a light gate opening and closing depending on the electrical field.

In a first aspect, the invention relates to a radiation emitting element comprising a radiation transmissive element having a first refractive index, a first surface, a second, opposite surface, a radiation emitter adapted to emit radiation of a predetermined wavelength into the radiation transmissive element, and a plurality of radiation controlling elements, wherein each radiation controlling element comprises:

a first liquid having a second refractive index,
a second fluid having a third refractive index being lower than the second refractive index, the second refractive index being closer to the first refractive index than the third refractive index,
means for altering a shape of the first liquid between two modes wherein:
  in a first mode, the first liquid being in contact with the first surface at a first surface part, and an interface between the first liquid and the second fluid, at the first surface part, is not parallel to the first surface part and
  in a second mode, a surface of the second fluid, at the first surface part, is at least substantially parallel to the shape of the first surface part,
wherein the first liquid has a transmittance of at least 10% at the predetermined wavelength.

In the present context, a radiation emitting element is an element adapted to emit radiation in a controlled manner. One manner of controlling the radiation may be a modulation over time, variation of intensity, wavelength, or a combination thereof, as is known from light sources, lamps, or the like. Alternatively or in addition, the modulation may be over a surface, such as when providing a display in which individual smaller areas (such as pixels) may be controlled.

In the present context, the radiation transmissive element is transmissive at least at the predetermined wavelength, so that this radiation may travel in the transmissive element. Naturally, the radiation transmissive element may have a sufficiently large transmission (preferably more than 20%, such as 30% or more, preferably 40% or more, such as 50% or more, preferably 60% or more, such as 70% or more, preferably 80% or more, such as 90% or more) at all wavelengths within a wavelength interval, especially if the radiation emitter emits radiation at more than one wavelength. Also, if the emitter emits radiation also at a non-desired wavelength, the transmissive element may be provided with a lower transmission at that wavelength in order to remove this undesired wavelength radiation.

The transmissive element has a first refractive index, a first surface, a second, opposite surface. The transmissive element may then be adapted to transport the radiation from the emitter by Total Internal Reflection, at least over parts thereof, if elements contacting the surfaces of the transmissive element have a sufficiently lower refractive index. In this context, it should be noted that the transmissive element may comprise multiple parts or layers having different refractive indexes. Normally, such layers will be fixed to each other. Also, lower refractive layers may be fixed to the transmissive element in order to facilitate assembly of the product and in order to ensure optimal contact between the layers to minimize undesired photon loss at that interface.

The transmissive element may have any desired dimensions: the overall extent thereof defines the surface from which the radiation is output from the multiple radiation controlling elements, as these operate to couple radiation out from the transmissive element. The thickness of the transmissive element may be selected based on production parameters, ease of launching radiation into the transmissive element or the like. When transporting radiation by TIR, a doubling in width will double the distance between the positions of impact of the photon on the TIR surfaces. For that reason, it may be desired to have a slim transmissive element.

The material of the transmissive element may also be selected based on the transmission desired at the wavelength (or wavelength interval) desired, as well as production parameters, strength, availability, price, and the like.

In the present context, a radiation emitter is an element adapted to emit radiation of a desired wavelength or with a desired wavelength interval. This element may be a radiation generator, such as an LED, OLED, incandescent lamp or the like, or may be an element converting radiation with another wavelength to radiation of the desired wavelength (interval), such as a fluorescent material. The radiation from the emitter is launched into the transmissive element in any suitable manner. Preferably, this launching is performed in a manner so that as much radiation as possible is launched within an angle supporting TIR transport within the transmissive element.

It should be noted that the radiation emitted into the transmissive element need not be within the visible wavelength interval. As will be described further below, radiation of non-visible wavelength(s) may be used and may be converted after having been emitted from the radiation controlling means.

The difference between the refractive indexes of the first liquid and the second fluid preferably is large enough for the interface between the fluid and the liquid to re-direct radiation. Preferably, the second refractive index is close to, such as as close to as possible, the first refractive index so that the interface between the first liquid and the transmissive element does not re-direct an excessive amount of radiation but instead lets the radiation travel into the first liquid for the radiation to instead be re-directed by the interface between the first liquid and the second fluid. Thus, it may be preferred that the third refractive index is as low as possible, taking into account the parameters of available and suitable materials. Changing the shape of this interface thus allows for changes of the redirection of radiation at the position of the first surface part.

In this context, the refractive index of the transmissive element will be that at the first surface, as the interesting part is the interaction of the radiation and this interface. Naturally, as the primary interest lies in the interface between the first liquid and the second fluid, the second fluid may be a liquid or a gas, as long as the refractive index is suitable. Providing a liquid has certain advantages, but a gas, such as ambient air, may also be used.

In this respect, the first liquid may be any type of liquid, depending on the mode of operation of the altering means. In one situation, the liquid may be magnetic, so that the movement of the first liquid may be by magnetic forces.

Preferably, the altering means operate by providing an electrical field, where one of the first liquid and the second fluid is more polar than the other. Providing an electrical field to the liquid/fluid will alter the surface characteristics thereof, and this may be taken advantage of by providing higher affinity surfaces in contact with the fluid/liquid. The liquid/fluid and a higher affinity surface may be chosen so that, at the electrical field provided, the fluid has a larger affinity to the higher affinity surface than without the field, and where the liquid has a higher affinity then the fluid to the higher affinity surface when the field is not provided.

This higher affinity surface may then be provided at the first surface part, whereby providing or removing the electrical field will alter the liquid/fluid interface at the first surface part.

Alternatively, the higher affinity surface may be provided adjacently to the first surface part, as the fluid/liquid interface may also be altered at this position, when the electrical field is turned on/off.

In a particular situation, the first liquid is an oil which has a low polarity, and the fluid is water-based, which has a larger polarity. The higher affinity surface is a hydrophobic surface, and in this embodiment, the oil will have a higher affinity (or lower repulsion) to the hydrophobic surface with no electrical field provided, but the electrical field will alter the surface characteristics of the water-based fluid so that it has a higher affinity to the hydrophobic surface. Thus, the water-based fluid will push the oil away from the hydrophobic surface, when the field is provided.

As an alternative, surfaces may be used to which oil has a large or very little affinity (so-called oilophobic surfaces or the like), in which manner the same type of operation may be achieved using oil as the driving force, whereby the fluid/liquid may be replaced by other materials.

In addition, the oil/water-based fluid may be encapsulated or contained by providing, in a closed circle around the oil/water-based fluid and the first surface part and any covering element (see further below), a hydrophilic material to which the water-based fluid has a high affinity, which will ensure that the oil does not escape.

In the second mode, the surface of the second fluid, at the first surface part, is at least substantially parallel to the shape of the first surface part. Thus, radiation traveling in the transmissive element by TIR will remain traveling therein, as it may move outside the transmissive element, if the first liquid is present in the first surface part, and be re-directed by the interface between the first liquid and the second fluid. If no liquid is present at the first surface part, the interface between the fluid and the transmissive element will re-direct the radiation. In both situations, the radiation will be re-directed by an interface at least substantially parallel to the first surface, whereby the TIR transport of the radiation remains.

In the present context, "parallel" and "not parallel" will mean an angular difference between any part of the interface and that of the first surface part. In this respect, even a very small angular difference may couple out radiation in that radiation traveling on or very close to the TIR angle will need only a very small angular correction to be coupled out, and radiation at lower angles will need additional corrections but will eventually also impinge above the TIR angle. It is noted that if the radiation is ideally transported within the transmissive element using TIR, radiation will always only be coupled out at the first surface areas.

In this context, "not parallel" means that the angular difference between any part of the interface (within an area corresponding to a projection of the first surface part and onto a plane of the first surface part) has an angle to the first surface part being 1° or more, such as 2° or more, preferably 5° or more, such as 10° or more. Larger angles may be obtained, depending on the altering means.

In the first mode, to the contrary, the radiation will travel into the first liquid and interact with the interface between the fluid and the liquid, which interface is not parallel to the first surface part, whereby the radiation will be directed into another angle than that at which the individual photons arrived at. Thus, the radiation may be directed into an angle which is not supported as TIR in the transmissive element, whereby the re-directed radiation will be emitted from the transmissive element. Thus, the first surface part will be a local area in which radiation, formerly transported in the transmissive element by TIR, may be provided with a different angle which will make the radiation escape the transmissive element when re-introduced therein by the action of the interface. The providing of the plurality of radiation controlling elements, such as all radiation providing elements of the radiation emitting element, with the same liquid, and at that with a first liquid has a transmittance of at least 10%, a very versatile emitting element is provided which is easily produced and which may be used for both illumination purposes as well as displays.

It is noted that it is desired that the first liquid transmits as much as possible of the radiation. Thus, a transmittance of 20% or more is desired, such as 30% or more, preferably 40% or more, such as 50% or more, preferably 60% or more, such as 70% or more, preferably 80% or more, such as 90% or more.

Also, in the situation where the radiation emitter emits radiation within a predetermined wavelength interval of desired wavelengths, it is preferred that the absorption of the first liquid over the wavelength interval is as even as possible. Thus, it is desired that the difference in absorbance over the interval is no more than 20%, such as no more than 20%, preferably no more than 5%.

In one embodiment, at least one of the radiation controlling elements comprises a covering element having a fourth refractive index being lower than the first refractive index and abutting the first surface and being positioned adjacent to the first surface part, the altering means of the at least one radiation controlling element being adapted to, in the second mode, move at least part of the first liquid to a position overlapping the covering element.

In this situation, the fourth refractive index preferably is sufficiently low to support any TIR transport of the radiation in the transmissive element. Thus, when moving the fluid to the position overlapping the covering element, this liquid will no longer affect the transport of radiation. In one embodiment, as will also be described further below, at least substantially all of the liquid is moved to the position overlapping the covering element, no liquid is present at the first surface part, and the re-direction is carried out by an interface between the fluid and the transmissive element.

As radiation may, in the first mode, travel to the opposite (opposite to the transmissive element) side of the covering element, the covering element may be transmissive to the radiation to allow this radiation to travel back to the transmissive element. In fact, the covering element may be provided with a structure or refractive index changes which act to direct the radiation to a direction more across the transmissive element to further enhance out coupling of this radiation.

In general, several manners exist of providing a display or lighting source using the present invention.

In one manner, the radiation emitter comprises a plurality of radiation emitters and a controlling means adapted to control the individual radiation emitters to emit radiation into the radiation transmissive element sequentially in time. In this manner, visible light of different colours (such as the colours used in normal TV's or monitors) may be emitted into the transmissive element sequentially in time. In that manner, preferably, the element further comprises a controller for controlling the altering means of the radiation controlling elements in coordination with the controlling means for controlling the radiation emitters. Thus, a display may be provided providing any desired image, when the opening/closing of the radiation controlling elements (knowing these elements' positions over the surface of the display) is coordinated with the timing of launching the different colours of visible radiation there-into.

As an alternative manner, the element may further comprise a plurality of radiation converting means each being adapted to receive and convert radiation emitted from one or more radiation controlling elements to radiation of one or more wavelengths different from the predetermined wavelength.

Thus, the radiation emitted into the transmissive element may be the same at all times (the same wavelength or wavelength interval), and the individual, desired colours at the individual positions may then be provided by the converting means. It is noted that in this situation, the radiation emitted into the transmissive element need not be visible. In fact, a number of advantages are obtained when launching UV radiation or near-UV radiation into the transmissive element.

In one situation, the converting means at different positions are different, much as the fluorescent dots on CRT's, whereby each radiation controlling element may control the radiation emitted toward one dot and thereby control the amount of visible light provided at that position with the particular colour.

In another situation, the radiation converting means are adapted to convert emitted and received radiation into at least substantially white light. In this situation, a white light source is provided, which has a controllable white light intensity at the different positions of the radiation controlling elements.

This white light source may be further enhanced when it comprises means for determining a wavelength of radiation emitted by the radiation emitter, for selecting one or more of the radiation converting means on the basis of the determined wavelength and for controlling the altering means accordingly. This relates to the fact that many common radiation sources will age in a manner so that their intensities and wavelengths or wavelength intervals will change. In this situation, the overlap between the wavelength(s) output and the absorption spectrum of the converting means will become less effective. In this manner, different converting means each targeted at a given wavelength (interval) may be used, so that different converting means are selected over time in order to optimize the overlap between the parameters of the radiation emitted and the absorption parameters and thereby the intensity of white light emitted. Different converting means all adapted to convert received radiation to white light normally would be a blend of fluorophores. Different blends may be optimized for different indicent wavelengths or wavelength intervals.

Another use of the white light source would be as a so-called backlight, where the element may further comprise colour selecting means adapted to receive converted radiation from the converting means and remove therefrom radiation of a predetermined wavelength or radiation within a predetermined interval of wavelengths. A particularly interesting embodiment is one in which the converted radiation is launched through colour filters, which again makes each area, such as the area illuminated by each radiation controlling element, controllable to have a given colour, being that of the filter at that area. A widely known array of colour filters would be the so-called Bayer filter used in e.g. cameras.

The present element may additionally be further provided with a display element comprising a plurality of intensity controlling elements each adapted to receive radiation from the converting and/or selecting means and output received radiation with a predetermined intensity. In one situation, this may be an array of LC elements each positioned in front of a converting means and/or a radiation controlling means for controlling the intensity of visible radiation output thereby. One manner of obtaining this type of display is to provide one LC element for each one or more radiation controlling elements and/or for each converting means. Then, the LC element will control the intensity of light provided by the converting means/controlling element(s). Either, only converting means and/or controlling elements are used emitting one colour or one set of colours, whereby other colours or sets of colours are output at other points in time, or the converting means/controlling elements emit different colours simultaneously. One particularly interesting embodiment is one wherein the element further comprises a backing element extending along the first surface and delimiting a space in which the first liquids and the second fluids are positioned, the space being further delimited by a viscous liquid extending between the first surface and the backing element along a closed curve encircling the radiation controlling elements.

In this situation, the fluid and liquid are enclosed in a space between the transmissive element, the backing element and the viscous liquid. Thus, evaporation/escape of the fluid/liquid may be prevented or at least substantially reduced.

In fact, this has the further advantage that the viscous liquid may be the same as the first liquid, whereby production is even further facilitated. Naturally, different liquids may be used, even though this requires dosing the liquid instead of e.g. simply pouring in on the surface.

This may be seen when the backing element or the transmissive element is provided with a number of predetermined areas, at least one for each radiation controlling element, of a surface to which the liquid has a larger affinity than areas surrounding these areas. In addition, the closed curve is provided with a similar material. In addition, the closed curve is provided with a width which is larger than the lowest dimension of any of the predetermined areas. In this situation, the liquid may simply be poured over the surface, whereby drops of the liquid will "stick" to the predetermined areas as well as covering the closed curve. Due to the dimensional requirements, the height of the liquid will be higher along the closed curve compared to the predetermined areas. This height may be controlled by acting on the liquid with a force, such as gravity (by tilting the element), or by rotating/moving the element. This force will then cause liquid to fall off, reducing the height of the individual drops without substantially changing the relative height differences.

Then, the element with the liquid drops (transmissive element or the backing element) may be combined with the other of the two elements so that the higher close curve touches the other element and thereby seals the internal "chamber" without the lower drops touching the other of the two elements. Thus, the smaller drops will be able to move as required by the altering means while the closed curve seals the space. Naturally, other spacing elements may be provided, such as larger areas inside the closed curve. Providing a larger area, also of the higher affinity material, inside the closed curve will provide this area with a higher drop, which may also contact the other of the two elements after assembly. This higher drop may, prior to assembly, be provided with a solid spacing element, such as a ball or pellet, which has a height/diameter corresponding to the desired space to be maintained. This ball or pellet, once provided in the liquid, will remain there even during handling prior to assembly, due to the surface tension of the liquid.

Due to the fact that the overall height of the liquid of the predetermined areas and closed curve relates to the smallest dimensions thereof, these dimensions may be adapted to the height desired. Also, the properties of the individual areas and the areas surrounding these will have an influence on the height obtained. This is standard knowledge to the skilled person.

In the situation one of the liquid/fluid is water or water-based, preferred surfaces of these high affinity surfaces are hydrophilic, and the areas between high affinity surfaces are less hydrophilic. In another situation, one of the liquid/fluid may be oil, where the high affinity surfaces may again be less oliophobic (more oliophilic) than other areas in order to bind the oil at the desired positions.

It is clear that a large variety is available as to the altering means. In one situation, the altering means of at least one radiation controlling element is adapted to move at least all of the first liquid to the first surface part in the first mode and away from the first surface part in the second mode. In this manner, no liquid is present at the first surface part, and the re-direction of the radiation is handled by an interface between the transmissive element and the fluid.

In general, the altering means may be adapted to facilitate both the change from the first mode to the second mode and vice versa, or the change from one mode to the other may be "automatic".

In the first situation, acting on the fluid and/or liquid with a force in both "directions" will require larger power consumption, whereas it may provide a faster overall operation.

In the second situation, the automatic movement from one mode to the other may e.g. be obtained if the fluid or the liquid is e.g. water, the altering means may comprise hydrophobic surfaces acting on the water, which will act to drive the water into a given position, if this force is not counteracted by a greater force. In one embodiment, at least one of the radiation controlling elements is bistable so that altering between the first and second modes, preferably in both directions, requires feeding an electrical signal by the altering means and each of the first and second modes is maintained when the electrical signal is not provided.

In this respect, the elements or forces preventing the liquid from changing from one mode to the other may be provided in a number of manners. In one manner, the altering means of at least one radiation controlling element is adapted to move at least all of the first liquid to the first surface part in the first mode and to a second area or position, which does not overlap with the first surface part, in the second mode, the at least one radiation controlling element further comprising a separating element positioned between the first surface part and the second area/position, the separating element being adapted to prevent the first fluid from moving to the other of the first surface part and the second area/position, when the electrical signal is not fed. One manner of obtaining this is to provide the fluid or liquid as water or a water-containing liquid, and providing the separating element as a hydrophilic surface.

Thus, when provided in one mode, the liquid may be contained in this mode by the hydrophilic surface until provided with an additional force allowing the liquid to overcome the retention provided by the hydrophilic surface.

In another manner, the first fluid is a dipolar liquid, the second fluid is a fluid with a polarity lower than that of the liquid, wherein the altering means comprise one or more electrodes adapted to provide an electromagnetic field adapted to move the liquid, one electrode of the altering means being positioned adjacently to the first surface area, wherein the liquid, in the first mode, extends over a surface of the one electrode.

If a higher affinity surface is provided on the one electrode, and if a liquid/fluid combination is provided one of which has a higher affinity to the surface when a predetermined field strength is not provided and the other when the field strength is provided, the two modes may be provided. In this respect, the higher affinity surface may be at or adjacent to the first surface part.

However, when the electrical field is provided, it is attenuated by the presence of the lower polarity fluid. Thus, providing the predetermined field strength is not sufficient to facilitate a change in the mode.

Then, providing a higher field strength will be able to change the affinity of the liquid/fluid and thereby have the fluid cover the one electrode. Subsequent thereto, the predetermined field strength is sufficient to maintain that mode. Returning to the former mode will require the removal of the predetermined field strength or at least the providing of a lower field strength.

Consequently, the predetermined field strength may be taken or provided as a constant parameter, and the parameter facilitating the change is the addition or subtraction of field strength; the addition or subtraction of e.g. a voltage defining the field strength.

In a preferred embodiment, the first liquid is oil and the second fluid is a water-based liquid, where the water-based liquid, due to the higher polarity, will change its surface characteristics more than the oil when the electrical field is provided, as is described further above. The covered electrode is then provided with a higher affinity surface to which the water-based liquid has an affinity with the predetermined field provided and to which the oil has the larger affinity without the field.

Naturally, any of the above embodiments may be provided with additional elements, such as different controllers for controlling individual elements, such as coordinated operation of radiation emission, the radiation controlling elements, any LC elements, any sensors and the like.

Also, the radiation emitted from the element, from the radiation controlling elements, any converting means and/or any LC or other controlling means may be launched through additional optical elements for directing this light or radiation toward a single position (a single user) or broader so that other users may also view the contents. Alternatively, different optical elements may be provided in front of different controlling means/converting means/LC or other controlling elements, where a selection of the individual controlling element/converting means/LC or other controlling element may select not only the intensity/colour but also the desired optical effect.

A second aspect of the invention relates to a method of operating a radiation emitting element comprising a radiation transmissive element having a first refractive index, a first surface, a second, opposite surface, a radiation emitter adapted to emit radiation of a predetermined wavelength into the radiation transmissive element, and a plurality of radiation controlling elements, wherein each radiation controlling element comprises:

a first liquid having a second refractive index and a transmittance of at least 10% at the predetermined wavelength, a second fluid having a third refractive index being lower than the second refractive index, the second refractive index being closer to the first refractive index than the third refractive index, the method comprising the radiation emitter emitting radiation into the radiation transmissive element and simultaneously altering a shape of the first liquid between two modes wherein:

in a first mode, the first liquid is in contact with the first surface at a first surface part, and an interface between the first liquid and the second fluid, at the first surface part, is not parallel to the first surface part and in a second mode, a surface of the second fluid, at the first surface part, is at least substantially parallel to the shape of the first surface part.

Most of the definitions and descriptions relating to the first aspect of the invention are also relevant to the second aspect of the invention.

Thus, in one embodiment, at least one of the radiation controlling elements comprises a covering element having a fourth refractive index being lower than the first refractive index and abutting the first surface and being positioned adjacent to the first surface part, the altering step comprises, in the at least one radiation controlling element, moving, when altering to the second mode, at least part of the first liquid to a position overlapping the covering element. Thus, this covering element may be used for rendering the liquid inoperable in the second mode, and it may be transmissive to the radiation and may have a structure aiding in the out coupling of radiation.

In another embodiment, the emitting step comprises a plurality of radiation emitters emitting radiation into the radiation transmissive element sequentially in time. In this manner, the visible colours desired may be emitted into the transmissive element one at the time, the radiation controlling elements ensure that the colours are emitted where desired when the altering step comprises coordinating altering with the sequence of the radiation emitters.

In another embodiment, the method further comprises the step of a plurality of radiation converting means each receiving and converting radiation emitted from one or more radiation controlling elements to radiation of one or more wavelengths different from the predetermined wavelength. Then, the converting step could comprise converting emitted and received radiation into at least substantially white light. In that situation, the method could further comprise the steps of determining a wavelength of radiation emitted by the radiation emitter, selecting one or more of the radiation converting means on the basis of the determined wavelength and altering the individual radiation converting means. Also or alternatively, the method could further comprise the step of colour selecting means receiving converted radiation from the converting means and removing therefrom radiation of a predetermined wavelength or radiation within a predetermined interval of wavelengths.

Also or alternatively, the method could further comprise the step of a display element comprising a plurality of intensity controlling elements each receiving radiation from the converting and/or selecting step and output received radiation with a predetermined intensity.

In one embodiment, the altering step, in at least one radiation controlling element, comprises moving at least all of the first liquid to the first surface part in the first mode and away from the first surface part in the second mode.

In that or another embodiment, at least one of the radiation controlling elements is bistable so that the altering step comprises feeding an electrical signal by the altering means and each of the first and second modes is maintained when the electrical signal is not provided.

In one situation, the altering step, in at least one radiation controlling element, comprises moving at least all of the first liquid to the first surface part in the first mode and to a second area or position, which does not overlap with the first surface part, in the second mode, the at least one radiation controlling element further comprising a separating element positioned between the first surface part and the second area/position, the separating element preventing the first fluid from moving to the other of the first surface part and the second area/position, when the electrical signal is not fed In another situation, the first fluid is a dipolar liquid, the second fluid is a fluid with a polarity lower than that of the liquid, wherein the altering step comprises providing, using one or more electrodes, an electromagnetic field so as to move the liquid, wherein one of the electrodes being positioned adjacently to the first surface area, where the liquid, in the first mode, extends over a surface of the one electrode.

As described above, preferably, the first fluid is a water-based liquid, the second fluid is oil, and the first surface part is provided with higher affinity surfaces for water and oil respectively.

As described in relation to the first aspect, different optical post-treatments or operations may be provided or desired, depending on the use of the element and the position of any viewer(s).

A third aspect of the invention relates to a method of assembling a radiation emitting element, the method comprising:

providing a radiation transmissive element having a first surface and a second, opposite surface providing, on the first surface, a first plurality of higher affinity surface areas, providing on the first surface, a closed curve of a higher affinity material, the closed surface encircling the first plurality of higher affinity surface areas, providing, on the first surface a liquid having a high affinity toward the higher affinity surface areas and the higher affinity material, and providing a backing element and positioning the backing element so as to contact the liquid of the closed curve but not contact the liquid of the first plurality of higher affinity surface areas wherein the liquid provided on the closed curve extends farther from the first surface than the liquid provided on the first plurality of surface areas. Naturally, this radiation emitting element may be that of the first aspect, where the present liquid may be the first liquid or the second fluid of the first aspect element.

In this aspect, all parameters and operations of the transmissive element of the first aspect are equally valid in relation to the third aspect of the invention. Naturally, the high affinity surface areas and high affinity material correspond to the liquid in question. A high affinity relates to the liquid wishing to attach itself or deposit itself on the material/surface area compared to other parts of the first surface. Then, the high affinity areas/material will depend on the liquid used. If water is used, hydrophilic materials may be used, whereas oliophilic materials may be preferred, if an oil is used.

In this context, the high affinity material and the high affinity surface areas may be of the same or different materials.

Naturally, as the height of the liquid drop or curve will depend on the affinity of the liquid and the dimensions of the material, different liquids may be used as may different materials and/or different dimensions.

Thus, a larger height of the closed curve may actually be obtained with a narrower width, if the liquid and/or material is suitably selected.

It is noted that the higher affinity is relative to other areas of the first surface, and that e.g. the term "hydrophilic" may relate to a wide interval of contact angles of a drop of water on the surface.

In this context, a first plurality of higher affinity surface areas is provided. In the context of the first aspect, each such surface area may correspond to a radiation controlling element.

Naturally, a closed curve may have any shape, such as square, circular, oval, star-shaped, triangular or any type of shape.

Due to the different in height of the liquid, subsequent to assembly, the liquid of the closed curve will span and enclose the remaining liquid parts, if the assembly is stopped when only the layer at the closed curve contacts both elements.

It should be noted that the present technology works equally well with the high affinity areas/material positioned on the backing element.

When the closed curve has a lowest width being larger than the lowest dimension, such as in the plane of the first surface, of any of the first plurality of higher affinity surface areas, the resulting thickness of the liquid deposited on the closed curve may be higher, even if the same high affinity material is used, whereby the thicker layers will contact the other of the backing element and the first element before the thinner layers.

In one embodiment, the method further comprises the step of providing, within the closed curve, a fluid. This fluid may be used for filling the space between the backing element, first surface and the closed curve. This filling may be performed before or after assembly. If performed subsequent to assembly, it may be performed by positioning a hollow element, such as a hollow needle, through the closed curve and providing the fluid. Optionally, another hollow element may be used for simultaneously removing e.g. ambient air during providing of the fluid. In another embodiment, the method further comprises providing, on the first surface and within the closed curve, a second plurality of higher affinity surface areas each having a lowest dimension being larger than the lowest dimension of the first plurality of higher affinity surface areas.

Also, the method may further comprise providing, on the first surface and within the closed curve, a second plurality of higher affinity surface areas each having a lowest dimension being larger than the lowest dimension of the first plurality of higher affinity surface areas. Alternatively, another fluid or other high affinity material may be used to ensure that the liquid height is higher than that of the first plurality of surface areas.

This second plurality may be used as spacer elements provided inside the closed curve.

In a particular situation, the method further comprises the step of providing, at each of the second plurality of higher affinity surface areas and subsequent to the providing of the liquid, a distance defining element, such as a ball. This element is maintained in place at the individual area due to the surface tension of the liquid and may be used to provide a more precise and more rugged spacing element.

In yet an embodiment, the method further comprises the step of providing an acceleration force to the liquid subsequent to the step of providing the liquid and prior to the step of providing the backing element. In this manner, the overall thickness of the liquid at the curve and first/second pluralities may be reduced while maintaining a relative height difference, so that the above purpose may still be served.

BRIEF DESCRIPTION OF THE DRAWINGS

In the following, preferred embodiments are described with reference to the drawing, wherein:

FIG. 13.1 Shows a push & push binary lightgate (a) in open and (b) shut state.
FIG. 21 shows an illumination unit.
FIG. 21.1 shows an illumination unit waveguide.
FIG. 21.2 shows an illumination unit spacer layer.
FIG. 21.3 shows an illumination unit top surface.
FIG. 21.4 shows an illumination unit barrier layer.
FIG. 21.5 shows an illumination unit protective upper surface.
FIG. 21.6 shows an illumination unit protective lower surface.

DETAILED DESCRIPTION OF THE DRAWINGS

Figure 1:
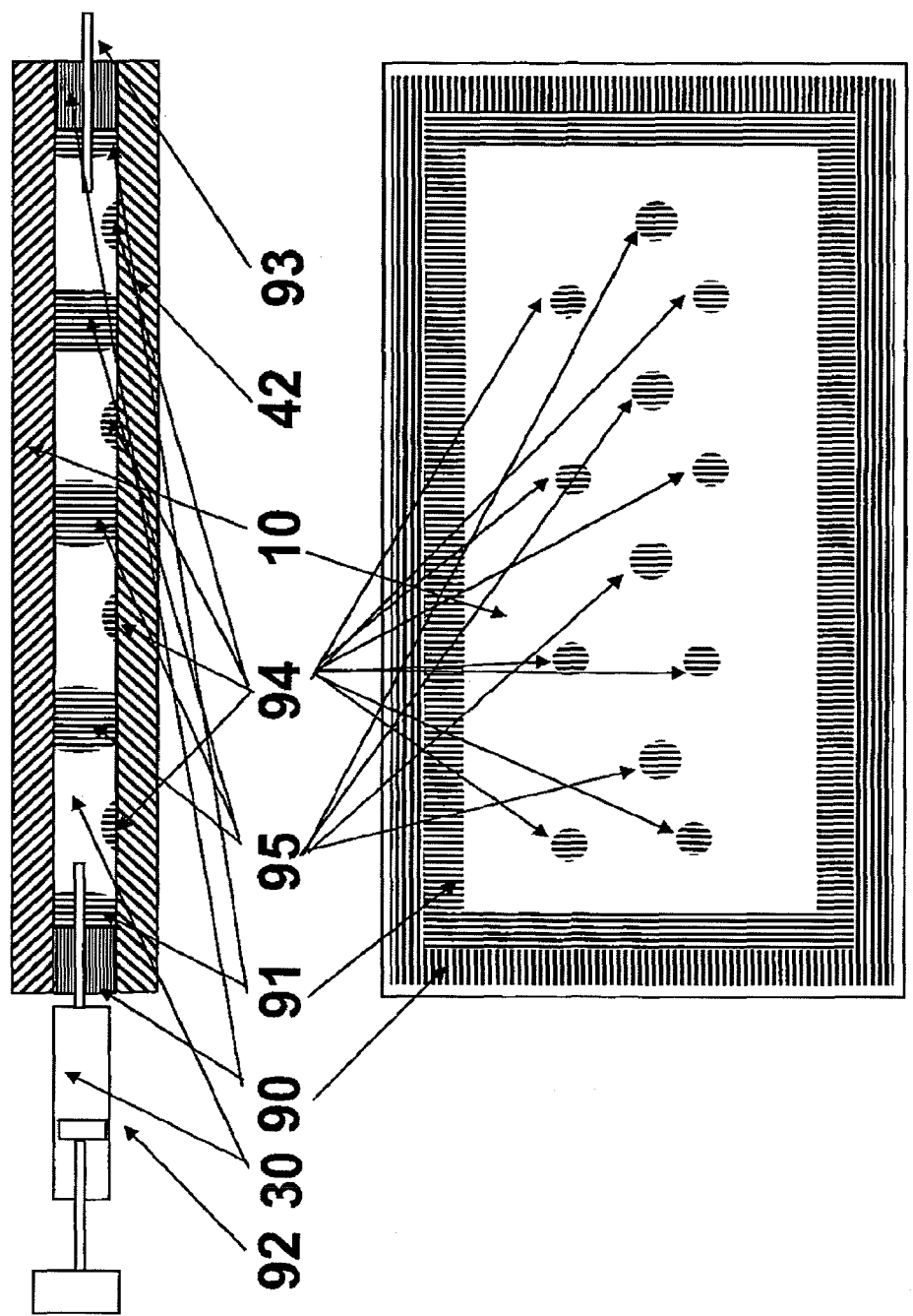
FIG. 1 shows an electrowetting optical device in side view cross section and top view depicting the position of the lightgates and the fluid spacers and the solid barrier and the fluid barrier and filling with dipolar fluid while gas is vented out through a tube.

FIG. 1 shows the basic configuration of an electrowetting optical device according to the invention. The waveguide 10 and lower substrate 42 are joined by the solid evaporation barrier 90. Inside the cavity created a fluid evaporation barrier 91 consisting of the same less polar liquid 35 used in the 94 lightgates contains the dipolar fluid. The dipolar liquid 30 will usually be water and water is difficult to contain. The solid evaporation barrier 90 will in case a polymer is used leave small crack where water vapour can escape and the glue used to attach the lower substrate 42 and waveguide 10 can also form small channels where water can escape. With a fluid evaporation barrier 91 inside a non dimensional stabile but highly water impermeable barrier can be established. The electrowetting optical device is produced by controlling the surface energy of the waveguide 10 and lower substrate 42 such that a pattern of oliophilic areas are surrounded by oliophobic areas. The less polar liquid 35 is then spin coated upon the waveguide 10 which deposits defined amounts of less polar liquid 35 upon the oliophilic areas. The oliophilic areas that are not part of the lightgate apertures 96 can be optically decoupled from the radiation trapped inside the waveguide 10 by a low n cladding 5 with low n. Due to the surface tension of the less polar liquid 35 it will strive after forming droplets with the same angles so droplets formed on larger oliophilic areas will become slightly higher than droplets formed on smaller areas. In some instances the less polar liquid 35 spacers can be fitted with polymer or glass ball spacers with similar surface energy that will ensure that it will be completely covered by less polar liquid 35. When the waveguide 10 is assembled with the lower substrate 42 the larger droplets formed at waveguide 10 will connect between the two planar plates. In the areas surrounding the oliophilic areas less polar liquid 35 will not assemble and they are therefore ready for glueing the solid evaporation barrier 90 securely in place. The demands for the less polar liquid 35 are high transparency, low diffusion and low UV photoluminescence. The 30 dipolar fluid is supplied to the electrowetting optical device by a fluid pump 92 through a prepared channel in the solid evaporation barrier 90 and an intermediate channel through the fluid evaporation barrier 91. Capillary forces will draw the dipolar liquid 30 in provided that fluid tube 93 is connected to allow contained gas to escape. The process can be accelerated by doing it in low pressure surroundings such that a minimum of gas is contained inside the electrowetting optical device. When the filling is completed the fluid pump 92 and fluid tube 93 are removed and the fluid evaporation barrier 91 will seal the channels.

A way to counteract the evaporation is to replenish the water inside the electrowetting optical device is to leave the fluid pump 92 in place and to maintain a pressure such that the liquid pressure inside the electrowetting optical device is kept constant. Alternatively the electrowetting optical device can be fitted with an osmotic gradient by supplying salt or sugar to the dipolar liquid 30. To prevent dipolar liquid 30 to escape through the connection an aquaporin filter similar to the filters found in the cells of all living organisms is usable. Alternatively to an external reservoir a dew collector design based on nanostructures similar to the surface design of desert plants can be attached to enable the electrowetting optical device to self replenish the water content.

A way to counteract problems with gas entrapped in the liquids is to process the liquids in low pressure champers at all times. Gas inside the liquids may in some instance create bubbles or corrosive effects.

Figure 2:
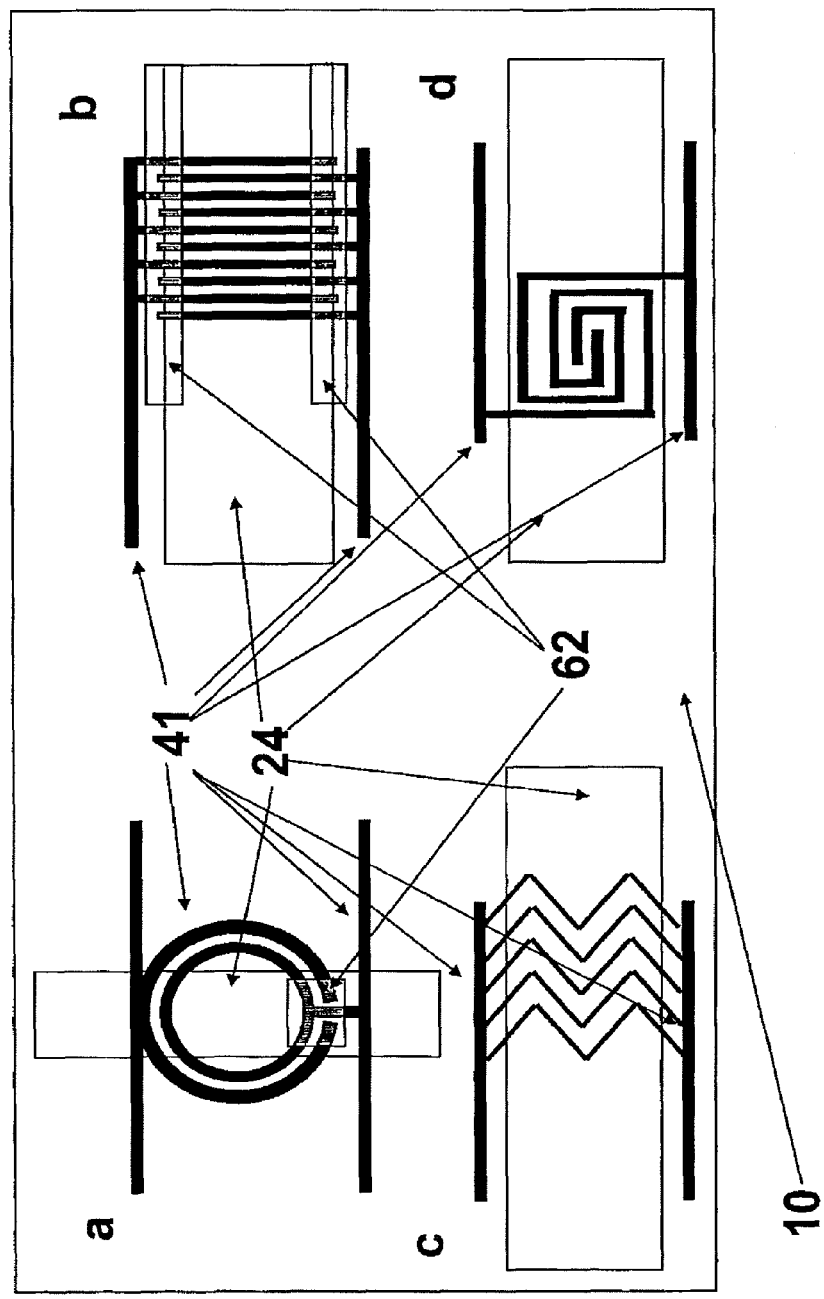
FIG. 2 shows a number of different arrangements of electrodes.

FIG. 2 shows a number of different arrangements of electrodes.

In FIG. 2 a. two charge electrodes opposite each other in the same level form a torus with an outer electrode and an inner electrode. On the opposite side the selector electrode 24 is positioned. Oliophobic passivation areas 62 are used to control that parts of the lightgate are inactive optically and mechanically because there are no 35 less polar fluid and therefore no competitive electrowetting and in the absence of less polar liquid 35 dipolar liquid 30 with low n will secure that the area will not interact optically with the radiation trapped by TIR inside the waveguide. Oliophobic passivation areas 62 are usable to avoid optical edge effects and also to create channels for turbulent liquid flow around the less polar liquid 35 movement.

In FIG. 2 a. the oliophobic passivation area 62 creates turbulence went and avoid unwanted optical edge effects. The torus shape creates a line that is at the same time optically omni directional except for the effect of the oliophobic passivation area 62. If the internal electrode is connected through the outer electrode via a sufficiently thin line that enters through the outer ring electrode in a skewed angle it is possible to create a torus without the need for (oliophobic passivation areas 62). An advantage of a torus with push & push electrode configuration is that it is feasible to design the system such that there will be no net movement of fluids in the horizontal plane. The less polar liquid 35 will merely be moving at the same spot spreading and contracting and the dipolar liquid 30 inside the lagoon will just change form with no net movement of volume across the atoll. The same stationary movement can be achieved with a push & flush electrode if it is curled up as a essentially circular or elliptical shape this will however be at the expense of switchtime because the oliophilic area will increase and attract a larger amount of less polar fluid.

In FIG. 2 b. two comb shaped electrodes are intertwined to form the lightgate and oliophobic passivation areas 62 are utilized to separate the dynamic areas where fluid turbulence is created by the electrowetting. The result is a design where the lightgate essentially constitutes a line of sub lightgates arranged as linear micro lightgates. The purpose of this design to create lightgates with the smallest possible horizontal cross section because this minimize fluid movement and thus in turn both expended energy and switchtime. The oliophobic passivation area 62 is also usable as a means of controlling the fill factor of the apertures that outcouple light from the waveguide and thereby the light extraction efficiency in specific areas.

In FIG. 2 c. lower electrodes 41 are arranged in a saw tooth like pattern that is addressed by selector electrode 24. Here there are shown no oliophobic passivation areas 62 so the system must rely on common directional pressure build up and release.

In FIG. 2 d. lower electrodes 41 are arranged in a double spiral. There are no oliophobic passivation areas 62 shown but there could have been a few small ones to secure pressure vents that would offset the negative effects of turbulence and local pressure build up.

Not shown in the figure it is feasible to create lightgates where the electrodes are positioned in several layers separated by dielectric layers and therefore allowable to cross each other. Crossing electrodes opens for designs with multiple electrodes. The general principle for lightgates is that any figure that is possible to draw with a line (representing aligned aperture and low n island 60 with surrounding hydrophilic areas) and an eraser (oliophobic passivation areas 62) is also possible to produce in a single layer provided that there is access for the upper electrode 25 and upper electrode2 26 to be aligned.

Transparent electrodes are relevant whenever electrodes are positioned in the optical pathway between the waveguide 10 and the beholder. Alternatively to transparent electrodes mirroring electrodes in a mesh can be employed as the openings in the mesh will allow radiation from the waveguide 10 to reach the beholder. Most transparent materials suited for electrodes such as ITO will provide a high refractive index that cause potentially unwanted Fresnel reflection if the layer is sufficiently thick to be experienced by passing light as a high refractive material, so a thin deposition layer in 20-40 nm will prevent Fresnel reflections.

Electrodes that are not in the optical pathway between the waveguide 10 and the beholder may be mirroring or absorbing depending upon whether the object is to recycle photons or rather absorb photons. For all electrodes it is feasible to reduce their optical interaction with impinging radiation by a low n cladding 5 layer with low n which will serve as a highly effective TIR mirror in angle above the critical angle formed by the refractive indices between the low n cladding 5 and adjacent surface such as for instance the waveguide 10. In this way electrodes will limit unwanted absorption of light.

Figure 3:
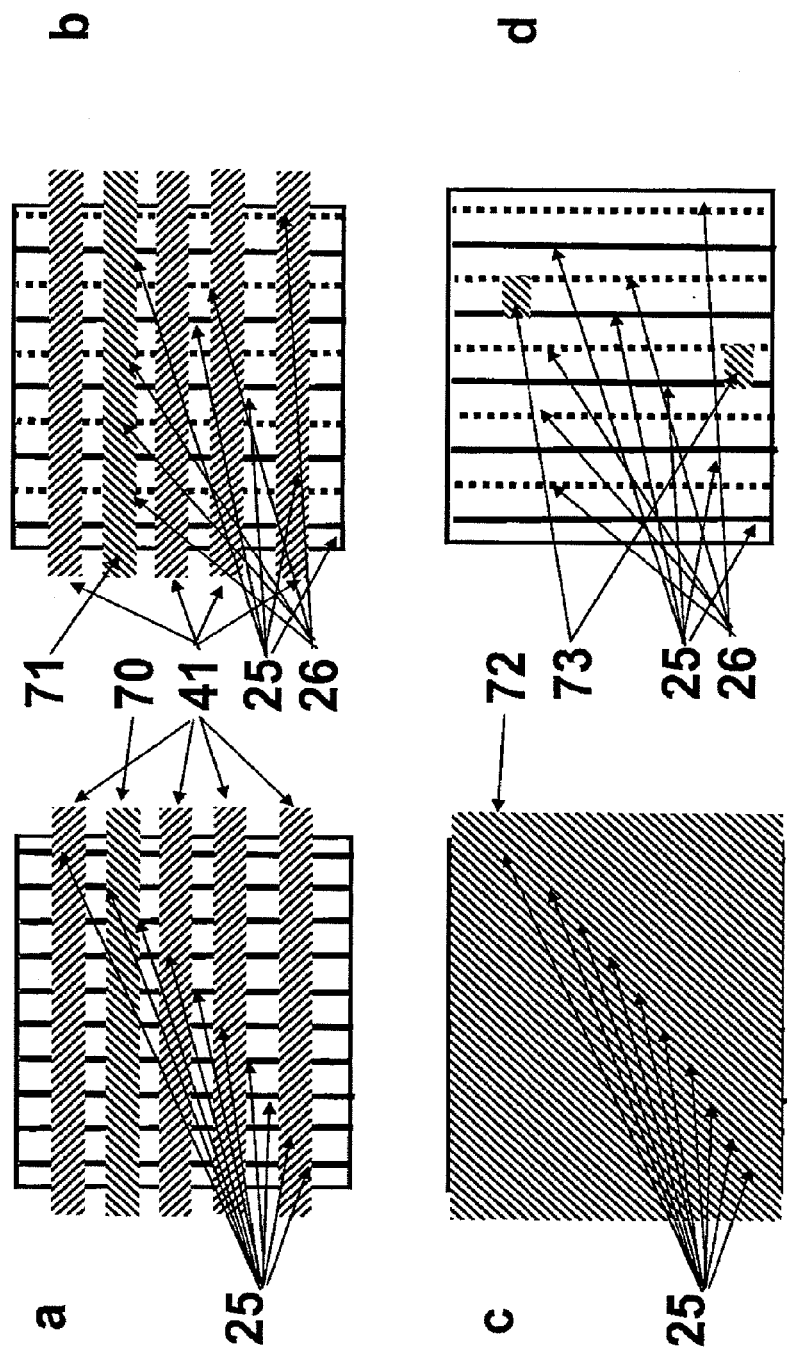
FIG. 3 shows four principal arrangements of electrodes that constitute different ways of addressing lightgates.

FIG. 3 shows four principal arrangements of electrodes that constitute different ways of addressing lightgates.

In FIG. 3 a. the push & flush row selector 70 selects a push & flush lightgate. The column electrodes are controlled by the drive circuitry not shown so the system is a passive matrix with two electrodes per lightgate.

In FIG. 3 b. push & push selector electrode 71 selects a push & push lightgate. Designs with three electrodes per lightgate allow differentially driven lightgates. Passive matrix usually is prone by crosstalk and heightened levels of Electro Magnetic Interference emission. Electrowetting is almost completely symmetric between positive and negative electric field potentials In push & push designs each lightgate has three electrodes one push & push ground selector 71 on top of the lower substrate 42 and two upper electrodes 25 and upper electrode2 26 beneath the waveguide 10. How the electrodes are patterned within the pixel (be it rectangles, torus', islands, spirals, etc) does not matter in this respect, as long as the capacitances between each of the two upper electrodes and the selector electrode are the same (within each pixel).

Upper electrode 25 and upper electrode2 26 are either driven at 0 v or 10 v depending upon whether the less polar liquid 35 is to be pushed onto the aperture 96 or the low n island 60 and the push & push ground selector 71 is driven at 10 v every time it selects a row similar to one of the upper electrodes and 5 v similar to the average charge of the two upper electrodes when it is not selecting (it can also be driven at 0 v when selecting rows the important thing is that it match one of upper electrode 25 or upper electrode2 26 when selecting rows and has the average charge of the two upper electrodes when not selecting). This means that the lightgates when updated will see an electric field of a magnitude proportional to the difference in potential between the each of the upper electrode 25 and upper electrode2 26 and the push & push ground selector 71.

When the row is not selected the row electrode is a 5V. This means each of the halves of the pixel will have a field-strength with the same magnitude, but with opposing sign. The difference in potential between the push & push ground selector 71 and the two upper electrodes must be kept so small that the less polar liquid 35 is able to flush out to the bordering hydrophilic area surrounding the lightgate. If the potential difference becomes too big the less polar liquid 35 will be pushed up into high contact angles but the less polar liquid 35 will centralize in the middle of the lateral plane because the push is in balance from both sides. The latter is however not true if the lightgate has the barrier 63 area because this will result in high contact angles but at one side of the barrier 63 area.

No matter how the column electrodes are switching the net average of the changes will be 0 within each lightgate, and therefore zero within each push & push ground selector row 71, and that (zero) is the net amount of capacitively coupled noise that the non-selected row electrodes will be subject to.

Within each lightgate the switching of the column electrodes will induce a capacitively coupled current to the push & push ground selector row 71, but that current will stay local intra lightgate thanks to the symmetric differential drive of the upper electrode 25 and upper electrode2 26.

Further as the push & push ground selector row 71 can be stable at mid-rail (5V) when not selected to update lightgates, it can be driven actively to that voltage, making the non-selected rows forming a low-impedance plane, acting as an RF shielding ground plane and reducing RF emissions from the driving of the electrowetting optical device.

In FIG. 3 c. the push & flush common ground electrode 72 is constantly on and can be galvanically connected to the dipolar liquid 30. The column electrodes are controlled by the drive circuitry not shown so the system is a passive matrix with two electrodes per lightgate and each lightgate stretch the entire length of the column.

In FIG. 3 d. push & push active matrix ground selector electrode 73 selects a number of lightgates spread across the entire electrowetting optical device simultaneously.

It should be noted that is possible to address with the columns and use the rows as lower electrodes 41 and that the potential of the electrodes at the waveguide 10 side and lower substrate 42 side can be reversed as well.

Figure 4:
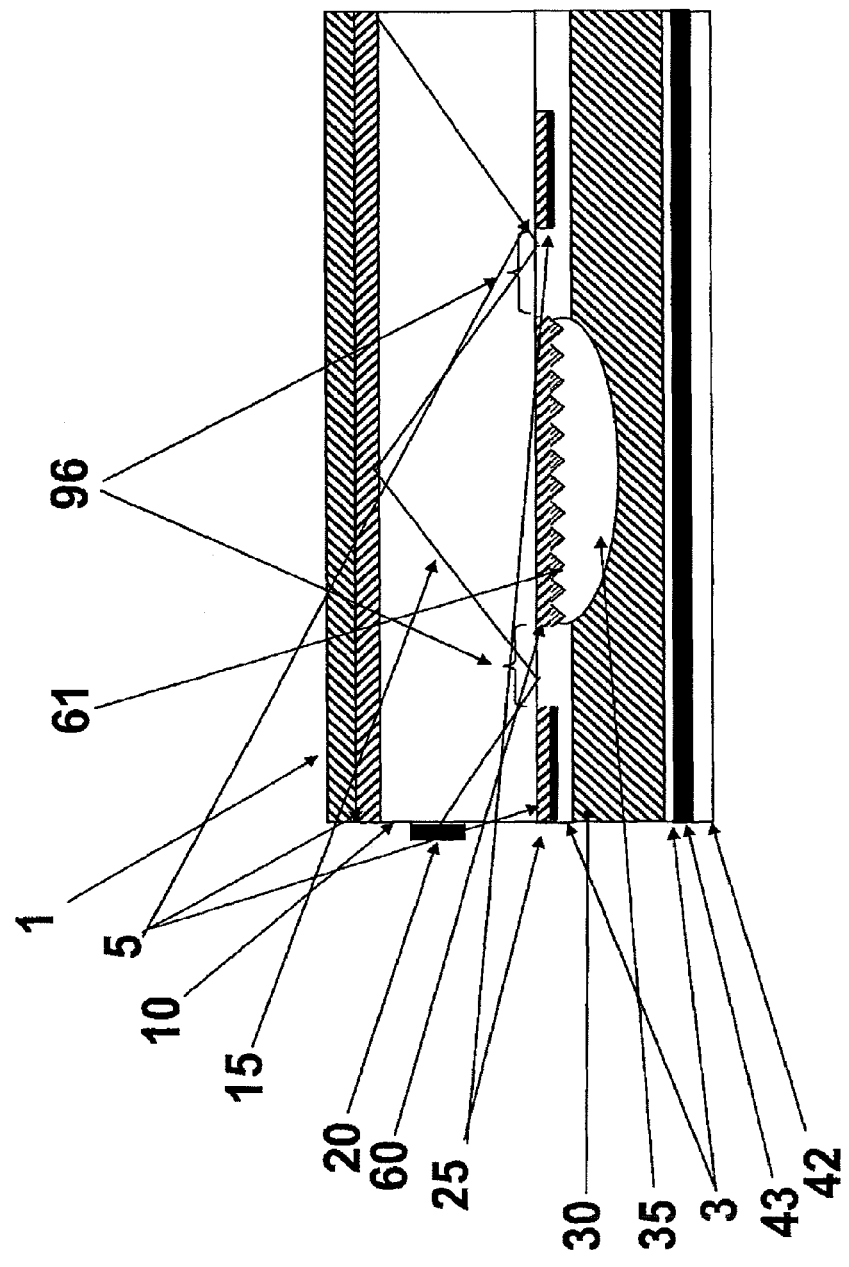
FIG. 4 shows an essentially round lightgate with a low n island in centre in shut state.

FIG. 4 shows an essentially round lightgate with a low n island in centre in shut state. The top surface 1 protects the electrowetting optical device, low n cladding 5 on top of the waveguide 10 ensures a critical angle inside the waveguide 10, low n cladding 5 in patterns above the electrodes and the low n island 60 maintain the critical angle except in the aperture 96. On top of the low n island 60 there are outcoupling structures 61 that ensures that radiation impinging upon the low n island 60 from the less polar liquid 35 side will pass through the low n island 60. Radiation having passed through the low n island 60 cannot become trapped by TIR since the low n of the low n island 60 prevent it from entering radiation above the critical angle formed between the waveguide 10 and the low n cladding. Radiation from light source 20 is entered into the waveguide in angles that are above the critical angle between the waveguide 10 and the low n cladding 5. The beam of light 15 impinges upon the low n island 60 and continue trapped by TIR. Had the beam of light 15 impinged upon the aperture then the dipolar liquid 30 would have provided a sufficiently low n to match the low n cladding 5 such that the radiation would continue TIR reflected inside the waveguide. In the figure the upper electrode 25 is situated beneath the dielectric layer 3 and it is not covering the aperture 96. If a transparent upper electrode 25 or a mirroring mesh upper electrode 25 had been employed the upper electrode 25 could have covered some or the whole aperture 96 area. The less polar liquid 35 is pressed up upon the low n island 60 by applied charge over absorbing electrode 43 and upper electrode 25 because the dipolar liquid 30 develop an affinity for hydrophobic surfaces when the polarization of the water molecules are changed by the applied electric field. The main principle of competitive electrowetting is that the dipolar liquid 30 pushes the less polar liquid 35 away and up in high contact angles. The lower substrate 42 supports the absorbing electrode 43 circuitry.

Figure 5:
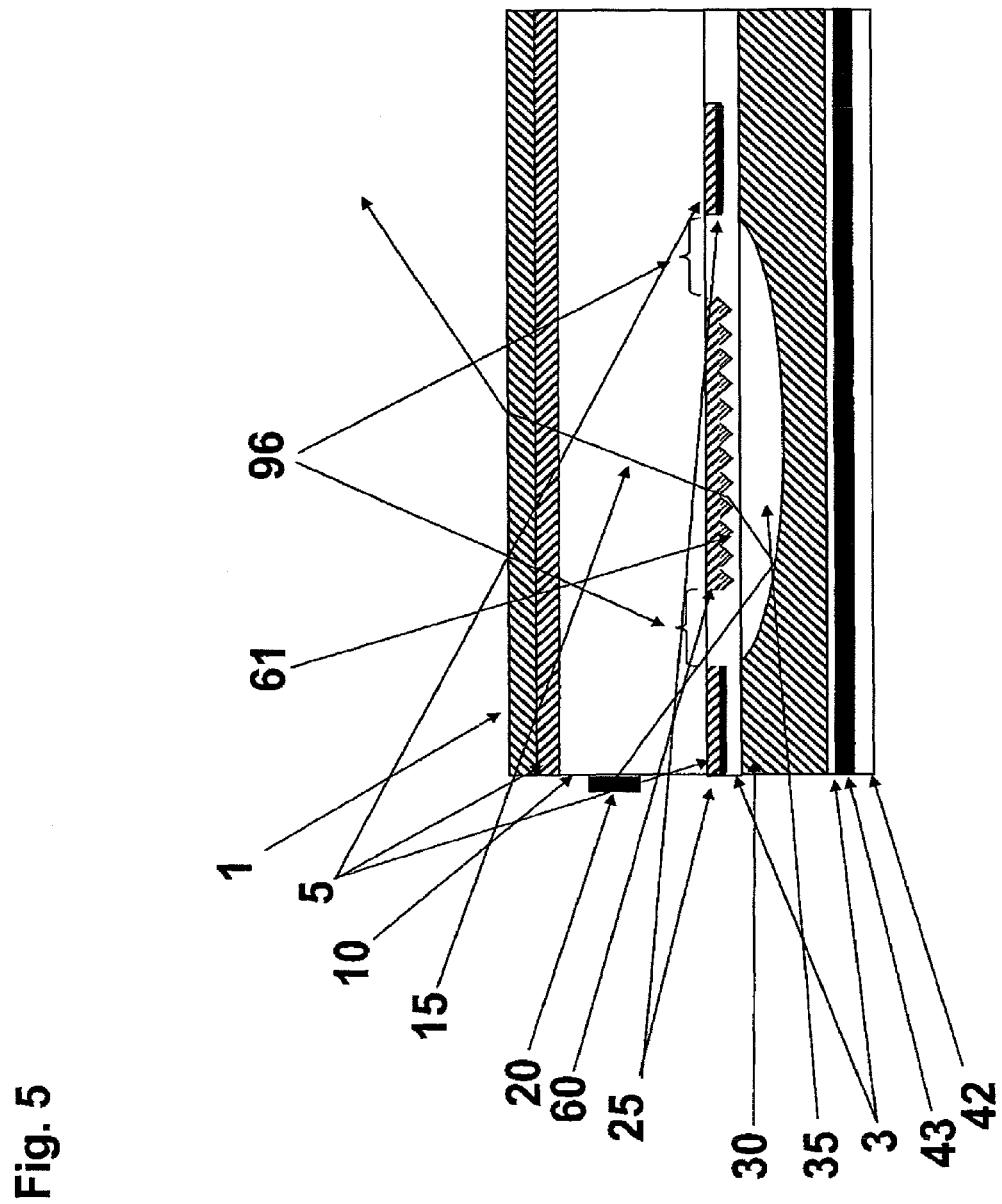
FIG. 5 shows an essentially round lightgate with a low n island in centre in open state.

FIG. 5 shows an essentially round lightgate with a low n island in centre in open state.

The beam of light 15 impinge on aperture 96 and enters into less polar liquid 35 because there is a match of refractive indices between the waveguide 10 and the less polar liquid 35. The beam of light 15 is reflected upon a TIR mirror formed between the less polar liquid 35 and the dipolar liquid 30 and continues towards the underside of the low n island 60 where outcoupling structures 61 send it into the waveguide 10 below the critical angle.

The general principle for the waveguide 10 is a design that ensures photon recycling. The photon recycling is achieved by low n cladding 5 on the upper side of the waveguide 10 can be of lower refractive index than the low n cladding 5 on the lower side of the waveguide 10 such that the critical angle at the upper side of the waveguide 10 is lower than at the lower side of the waveguide 10. This difference in critical angle will result in that radiation deflected below the critical angle inside the waveguide 10 will leave the waveguide 10 downwards. Flexible materials such as polymers or thin glass are usable for the waveguide 10 and will together with the low n cladding 5 arrangement with lower refractive index at the upper side allow electrowetting optical devices with flexible waveguides 10. The waveguide 10 can be made of materials that feature high transmissivity in the wavelengths to be used. The upper and lower surfaces of the waveguide 10 are important as any surface imperfection will result in deflection that accumulated can result in that light trapped by TIR drop below the critical angle and therefore exit the waveguide 10. The waveguide 10 must also be free of diffusion that can effect radiation to go below the critical angle. Edges of the waveguide 10 have to be cut with exactly 90 degrees and all edges has to be perfectly plane in order to reflect the impinging radiation without bringing the impinging angles below the critical angle. The thickness of waveguide 10 is significant for the fill factor of lightgate apertures 96 as the amount photons impinging on a given area scale linearly with the thickness of the waveguide 10 such that a waveguide 10 that is halved in thickness will have the double amount of photons impinging on a given waveguide 10 area and thus demand 50% less aperture fill factor to have the same effective fill factor. In order to enhance reflectivity low n cladding 5 is added to the edges so impinging radiation above the critical angle will be TIR reflected with 100% efficiency and behind the low n cladding 5 a high quality specular mirror is positioned to reflect light that impinge upon the edges below the critical angle. The edge mirror is shielded from oxygen by a dielectric layer 3 and a protective lacquer. The metal layer can be co-processed with 25 electrodes provided they also are made of mirroring material. Among mirroring materials aluminium, silver, gold, chrome and other metals are usable as the main attribute is high reflectivity.

The incoupling of light not shown in figure enters light above the critical angle and the design of the waveguide 10 will allow the radiation to recycle inside the waveguide 10 until it is either absorbed or deflected below the critical angle or deflected out of the electrowetting optical device by a lightgate. The effect of this is that light entered into the waveguide by a light source 20 can be parcelled into small portions of photons that can be treated by optical modulation means particular to the specific lightgate or the specific lightgate area which enables a multitude of different optical modulation principles and optical applications.

Among the suitable waveguide 10 polymer materials are optical PMMA, PET and Polycarbonate and among suitable glass BK 270, fused silica, LCD glass substrates, etc. all made in fused glass processing for perfect surface characteristics. A special consideration has to be afforded to the refractive index of the waveguide 10 material as a higher refractive index will provide higher refractive difference between the waveguide 10 and the low n cladding 5 which enables lower critical angle and thus facilitate efficient incoupling of light from the light source 20. Another consideration is however at there must be index match between the less polar liquid 35 in order to facilitate outcoupling into the less polar liquid 35 from the waveguide 10 without TIR cutting a high angle span of due to TIR between the waveguide 10 and the less polar liquid 35.

The optical function of absorbing electrode 43 is to ensure that light escaping from the waveguide 10 will not be reflected towards the beholder and that ambient light impinging upon the electrowetting optical device will be absorbed without causing unwanted reflectance. The absorbing electrode 43 is mainly relevant in display applications.

A black matrix not shown in the figure can be inserting between the lightgates and allow space for circuitry. The combined effect of the low refractive indices differences between the materials employed in the layers constituting the electrowetting optical device and the high absorptance achieved by the absorbing electrode 43 and the black matrix.

The mirror electrode 40 not shown in figure is an alternative in electrowetting optical devices intended for illumination because it will allow radiation outcoupled downwards by FTIR from the lightgates to be reflected towards the beholder. The combination of TIR and FTIR outcoupling is very efficient.

It should be noted that although the preferred embodiments of the invention all feature frontlight then it quite feasible to combine the elements such that the system can be a backlight solution. This is especially true for solutions intended for illumination applications.

Figure 6:
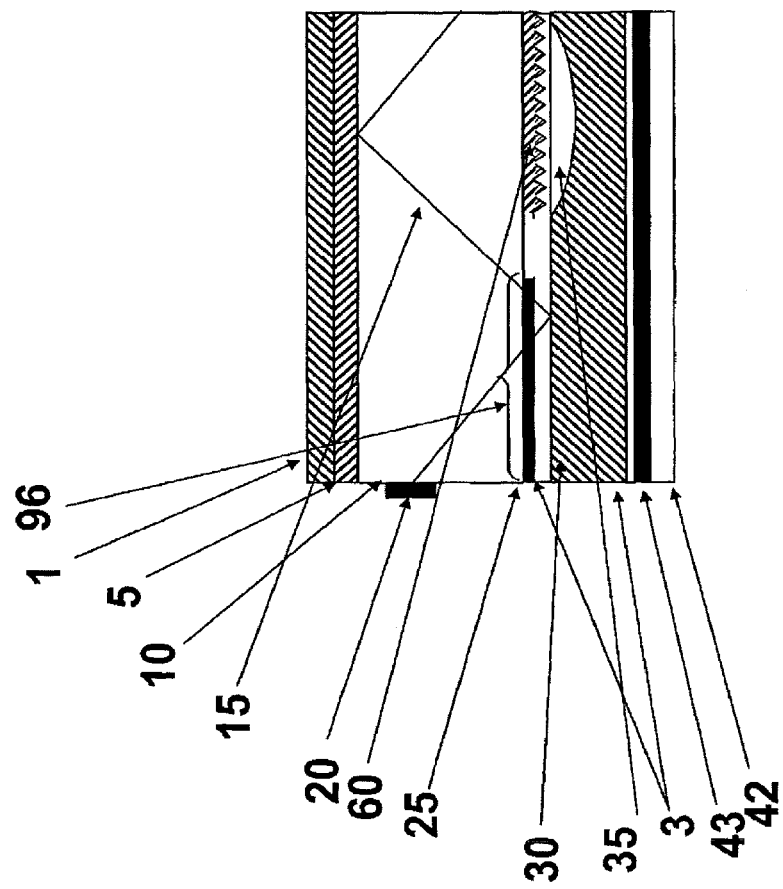
FIG. 6 shows a push & flush lightgate in shut state.

FIG. 6 shows a push & flush lightgate in shut state.

The push & flush lightgate is identical to the above design with the difference that the design does not curl up and form an essentially round figure but stay a line where the transverse movement of fluids are minimized and the amount of 35 less polar fluid and dipolar liquid 30 that is required to move is minimal due to reduced cross sectional dimensions.

Figure 7:
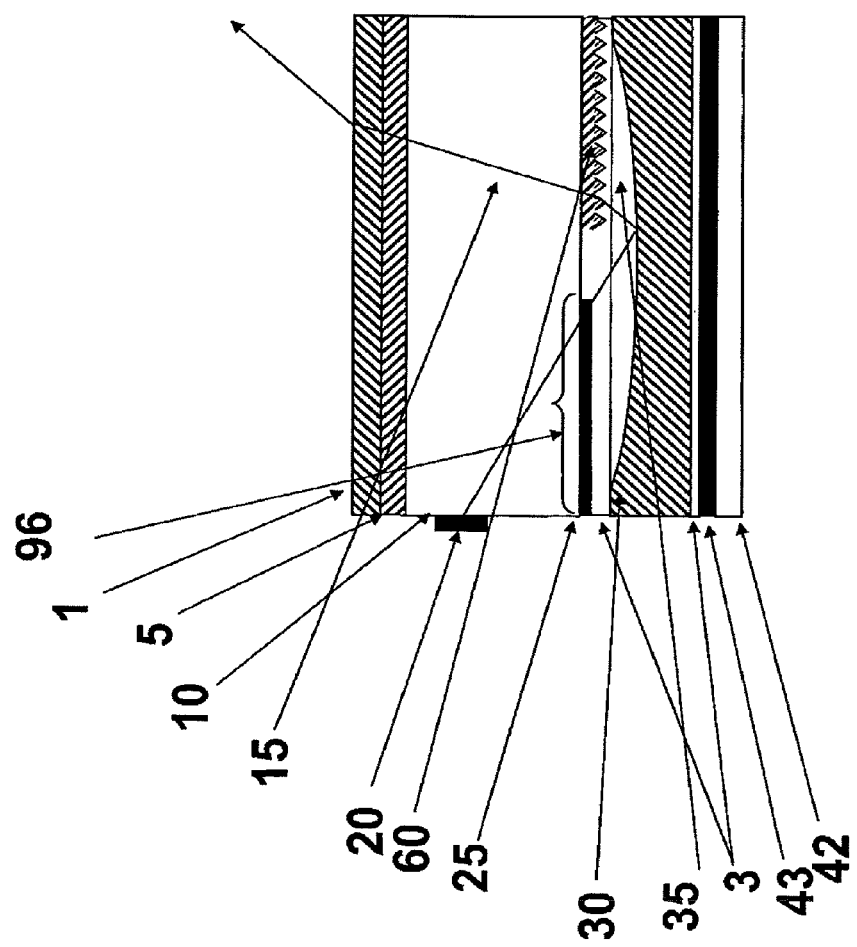
FIG. 7 shows a push & flush lightgate in open state.

FIG. 7 shows a push & flush lightgate in open state.

The lightgate opens when the less polar liquid 35 flush into the aperture 96 area after the applied charge to the upper electrode 25 is released. As all other electrowetting optical devices according to the invention the push & flush lightgate is a capacitor with two liquids inside. When a charge potential is applied across the lightgate the polarity of the dipolar liquid 30 will change and its affinity to the hydrophobic surfaces will change such that it will push the less polar liquid 35 away from hydrophobic areas. The push & flush lightgate is somewhat slow because only the push is caused by an applied field whereas the flush is not helped by an electric field.

Figure 8:
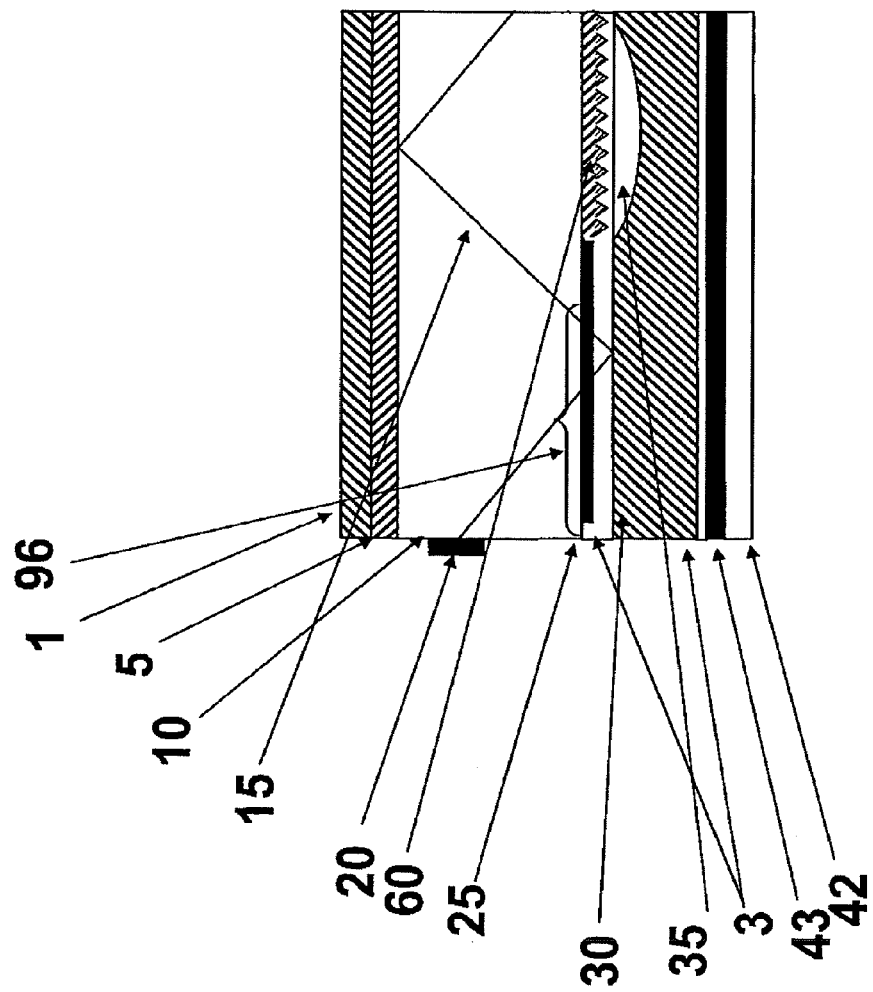
FIG. 8 shows a bistable push & flush lightgate in shut state.

FIG. 8 shows a push & flush lightgate in shut state with electrical controlled bistability.

In a design very similar to the ordinary push & flush lightgate it is feasible to utilize the less polar liquid 35 as an additional dielectric layer that decrease the electric field strength when the less polar liquid 35 flood the upper electrode 25. The decreased electric field strength match the electric field strength needed to prevent the less polar liquid 35 from flushing into the aperture 96 and this allows a bistability to be created by applying an electric charge across the lightgate when one of the two situations occur.

Figure 9:
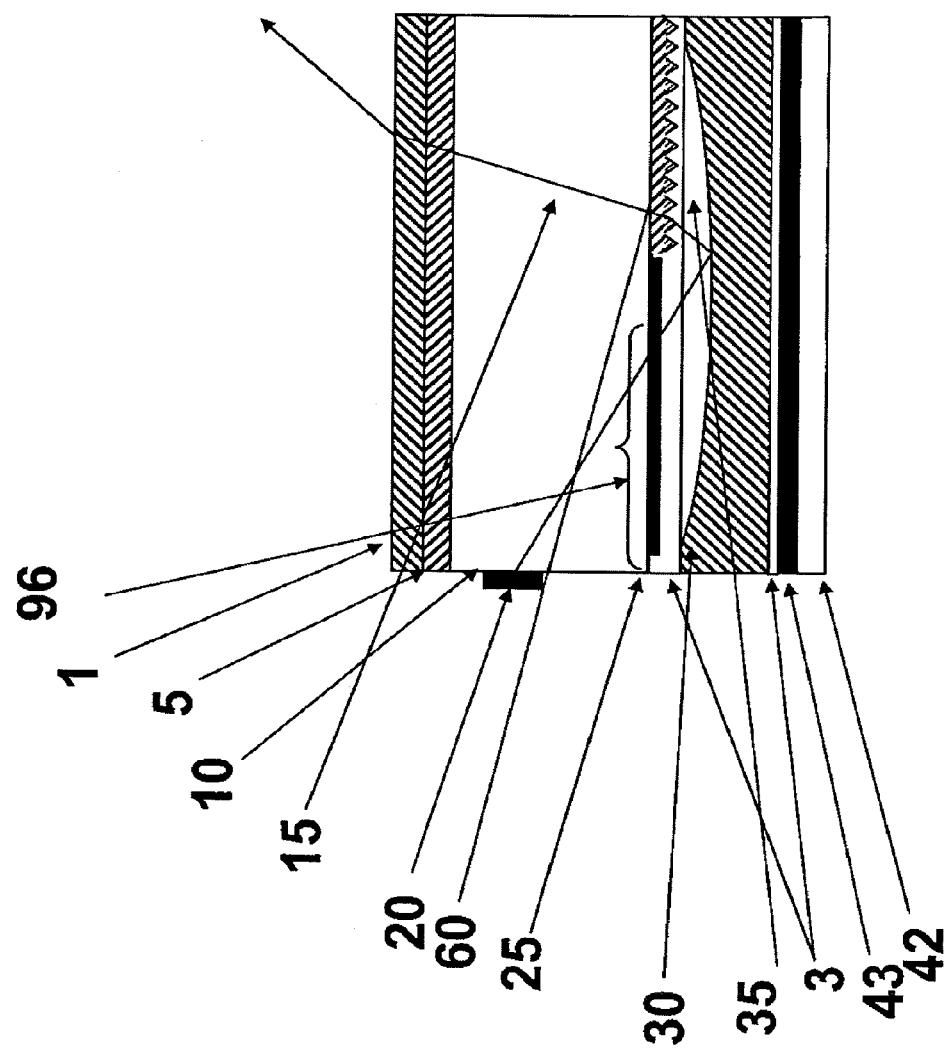
FIG. 9 shows a bistable push & flush lightgate in open state.

FIG. 9 shows a push & flush lightgate in open state with electrical controlled bistability.

Bistability is an advantage in display designs based on binary principles with multiple frames that create a binary Grayscale and colour depth by use of three light sources 20 with RGB primary colours that output energy amounts going from 1-2-4-8-16-32-64-128. Each of the RGB primary colours will feature a 8 bit resolution and combined they will deliver 24 bit true colour with 16.777.216 colours. For the system to accomplish this it is necessary to show 24 frames within the time span where a display normally show a frame. Video framerate is 24 which indicate that the system must switch from of to on within 1 ms and also allow the light source to output within that time span. If we are dealing with a high definition television then there are 1.080 rows and 1.920 columns. In a passive matrix each row can be selected exclusively once and all other rows can be selected collectively at the same time. This means that the system needs to address 1.080×24=25.920 times per frame. At video framerate each frame last 41.6 ms so the each row has to be completed within 1000/24/25.920/1.000=0.0016 ms 100 Hz framerate requires linearly faster switching. The bistable push & flush lightgate is most likely unable to reach this switching speed and is thus more useful in illumination applications where switching speed is not as important.

Figure 10:
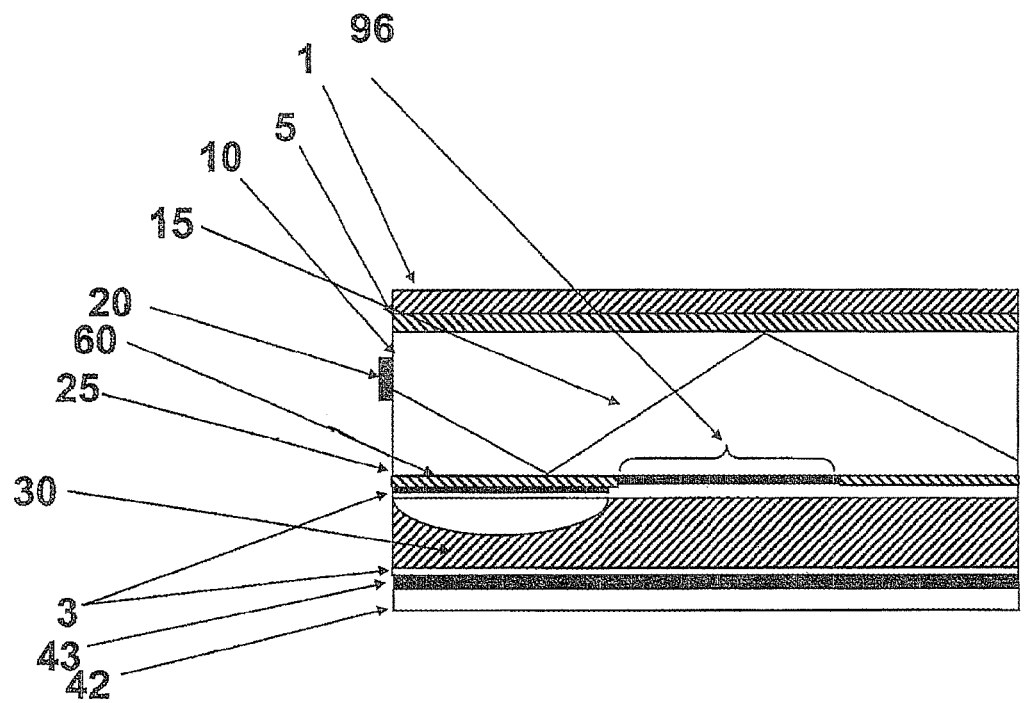
FIG. 10 shows a push & push lightgate in shut state.

FIG. 10 shows a push & push lightgate in shut state.

The push & push lightgate is faster because the amount of less polar liquid 35 becomes smaller as the entire less polar liquid 35 is moved from the low n island 60 to the aperture 96 with the same geometry within the less polar liquid 35 contain 75% less fluid. Also the added force achieved by having both upper electrode 25 pushing into the low n island 60 and upper electrode2 26 pushing into the aperture 96 increase switch speed.

Figure 11:
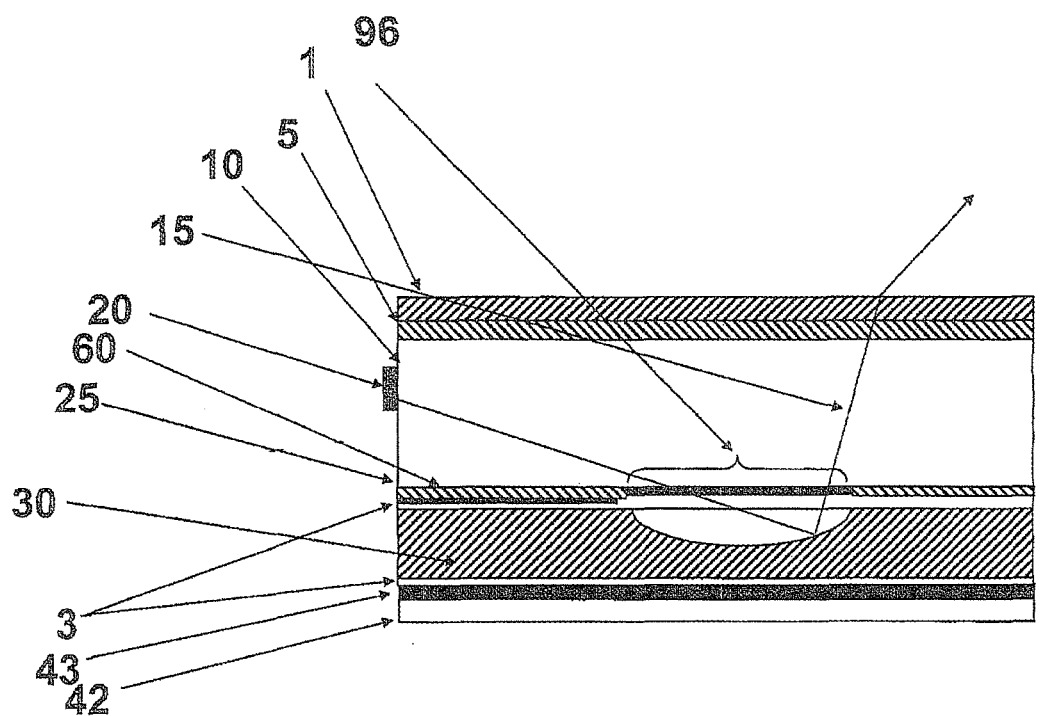
FIG. 11 shows a push & push lightgate in open state.

FIG. 11 shows a push & push lightgate in open state.

The less polar liquid 35 is pushed into the aperture 96. When the 71 push and push selector row electrode is charged the lightgate switch according to the potential on either upper electrode 25 or upper electrode2 26 but as soon as the charge on either electrode change the lightgate switch again. This makes this particular lightgate useful only in designs where a temporary on or of state is required fast and it is accepted that the state vanish after the charge to one of the three electrodes is removed. These characteristics are befitting for electrowetting optical devices based on a common ground where the upper electrode 25 and the upper electrode2 26 selects an entire column.

Figure 12:
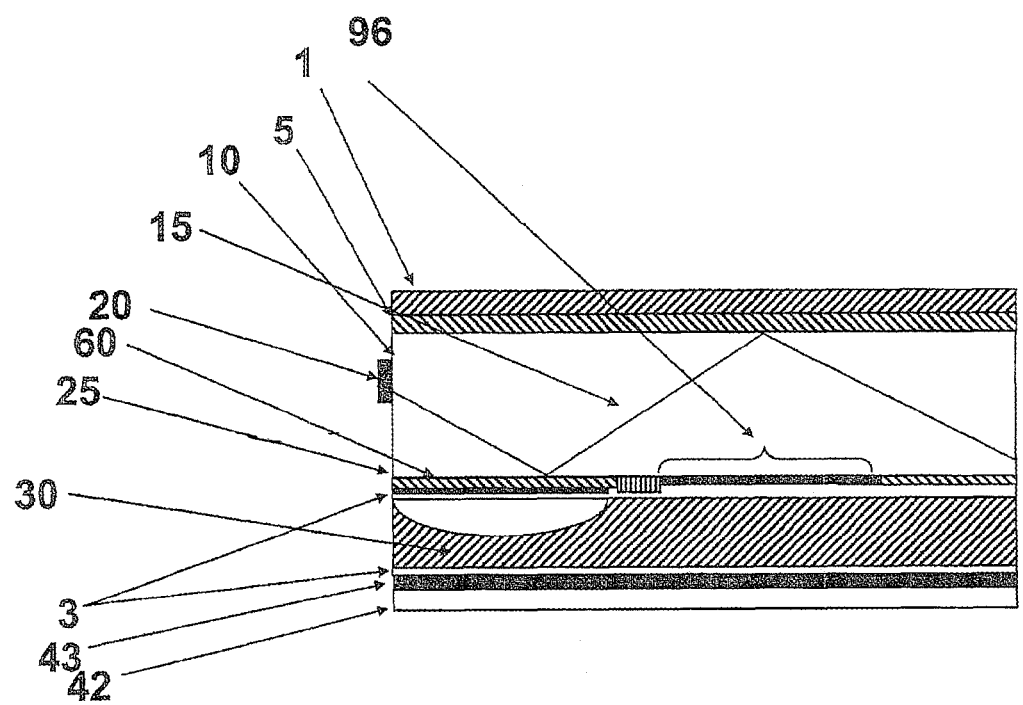
FIG. 12 shows a push & push binary lightgate in shut state.

FIG. 12 shows a push & push binary lightgate in shut state.

The push & push binary lightgate resemble the push & push lightgate except for a barrier 63 area inserted between the aperture 96 and the low n island 60. The barrier 63 is either hydrophilic or a combination of hydrophobic and oliophobic such that when either of the electrodes upper electrode 25 or upper electrode2 26 push the less polar liquid 35 to the low n island 60 or the 35 low n island to the aperture 96 it will first push the less polar liquid 35 up in a high contact angle before it flush across the barrier 63. When more than 50% of the less polar liquid 35 is moved across the barrier 63 the less polar liquid 35 attach stronger to the largest area on either side of the barrier 63 which will draw it across the barrier 63. Due to this self completion effect the required time where charge has to be applied to switch the lightgate is reduced and the lightgate is inherently bistable as well as truly binary because only one or the other state open or shut is feasible.

Due to fast switch speed and the bistability and the binary nature this lightgate is ideally suitable for truly digital displays and equally suited for illumination where analogue intensity levels are not required.

Figure 13:
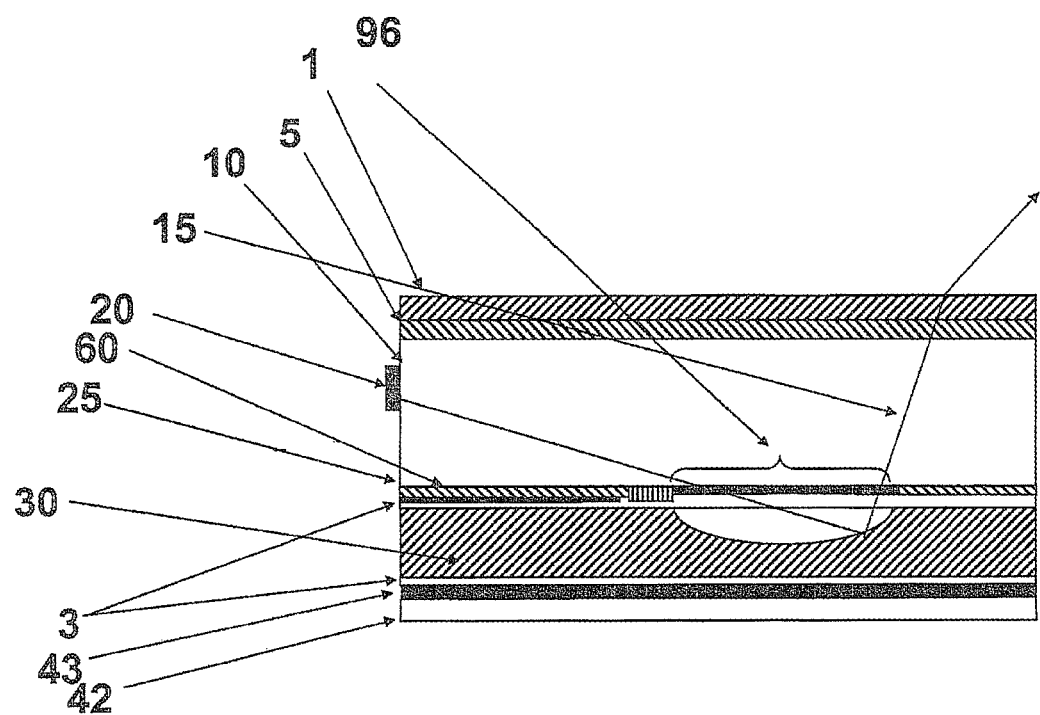
FIG. 13 shows a push & push binary lightgate in open state.

FIG. 13 shows a push & push binary lightgate in open state.

The need for high switch speed can be relaxed slightly by a few techniques that are enabled better due to the binary nature of this particular lightgate that allows the lightgate to stay in the state is has once been updated to.

The digital display principle is based on time modulation over several frames and is in its basic concept fixed to a certain framerate as for instance video framerate at 24 frames per second or classic CRT framerate at 50 frames per second or modern LCD framerate at 100 frames per second. There is however no reason that the time modulation should not be slower or faster depending upon the video content such that video sequences with slow movements are modulated over more frames than video sequences with fast movement which creates higher colour depth and better grayscale for slow moving images. The result of this approach is that it becomes feasible to show for instance 24 bit true colour in slow moving video content and 8 bit in fast moving video content. This coincide with human colour and Grayscale perception which is low for fast moving objects and high for slow moving objects.

The colour field sequential mode in its pure form is based upon the concept that each lightgate is also a single pixel but it is feasible to let the lightgates work ensemble as pixels. If you join two lightgates into one pixel you double the Grayscale and the colour depth. In this particular design it is feasible to join several lightgates into virtual pixels that can have any number of lightgates so an increase in Grayscale and colour depth can be achieved by lowering the resolution in particular areas of the display. This will go unnoticed by the human eye however because human vision system is mainly sensitive to contrast which will not be impacted by this strategy provided that the high contrast area of the image is shown with optimum resolution.

Another option is to Bin lightgates together such that you sacrifice Grayscale and colour depth for speed along particular rows and/or columns. If you for instance watch television content in 4:3 format on a widescreen display you do not need any resolution outside the 4:3 image so you simply bin these areas into a single black pixel which will leave you with more time for modulating the actual active 4:3 content area and thus with better Grayscale and colour depth. Also you can fit the display resolution to lower resolution content by binning the lightgates to emulate the lower resolution.

Another option which is feasible for all lightgates with two charge electrodes is to employ an active matrix ground. The configuration with the binary lightgate design is close to full active matrix performance because it can simultaneously address all lightgates but it is required to update both those lightgates that are to be shut and those that are to be opened while those that are not required to alter state are not addressed. Two frames per bit is required which entails that 48 frames are needed to create a full 24 bit true colour digital lightgate display. 48 frames is substantially less than a passive matrix update that requires 540 times more frames and the lessened number of frames translates into less switch speed requirement and consequently allows larger lightgate features. Ground electrodes controlled by an active matrix placed select all lightgates that are to be switched to the low n island 60 and when this is done then all lightgates that are to be switched to the aperture 96 are selected. The lightgates that does not require switching are not selected. Obviously it is feasible to choose addressing via columns instead of rows and it is likewise possible to let individual pairs of charge electrodes update selected lightgates alternating between opening and shutting lightgates independently of what is done on other pairs of charge electrodes. Due to the binary principle the active matrix can be simplified to only being able to send three instructions to each controlled ground electrode, charge matching the charge electrode with the highest potential, charge matching the charge electrode with the lowest potential and no charge. In a display application it is feasible to employ absorbing electrode 43 to enhance blacklevel whereas in illumination applications it feasible to employ mirror electrode 40.

FIG. 13.1 Shows a push & push binary lightgate (a) in open and (b) shut state. The less polar liquid 35 is in figure a. positioned in the low n island 60 where the radiation inside the waveguide 10 can not enter due to TIR created by the refractive index difference between the low n material used for the low n island 60 and the high n material used for the waveguide 10. The less polar liquid 35 forms a droplet due to the surface tension inside the less polar liquid 35 and the surrounding dipolar liquid 30, and the droplet is kept in place by the indention between the low n island 60 and the aperture 96. Due to the indention the less polar liquid 35 will either form a droplet in the 35 low n island or in the aperture 96. And while in transition from either the low n island 60 to the aperture 96 or vice versa the less polar liquid 35 will complete a movement from one side to the other if more than less polar liquid 35 attaches it self to position from which the transition has been initiated from. Due to the binary character of the design the switching requires electrodes beneath both the low n island 60 and the aperture 96. The indention principle may also apply to the other binary pixel designs. The depicted design could be different as there is no requirement of rounded forms on both sides or any sides of the indention. Any indentions between two bordering areas will create a bistable situation provided that the contact angle between the less polar liquid 35 and the underlying surface is sufficiently small so that it will not exert and outward pressure that exceeds the surface tension forces. The balance between hydrophobicity, hydrophilicity, oliophobicity and oliophilicity has to be such that the less polar liquid 35 will be contained by the indentions. A less polar liquid 35 can also be contained inside a form with several points that among them create multitudes of indentions through which the liquid can move. In a particular design the indentions could create a circular lightgate where the low n island is surrounded by an aperture 96 such as shown in FIG. 4 and FIG. 5. The design shown in FIG. 4 and FIG. 5 does not show the indentions and the needed double set of electrodes is not shown either.

Figure 14:
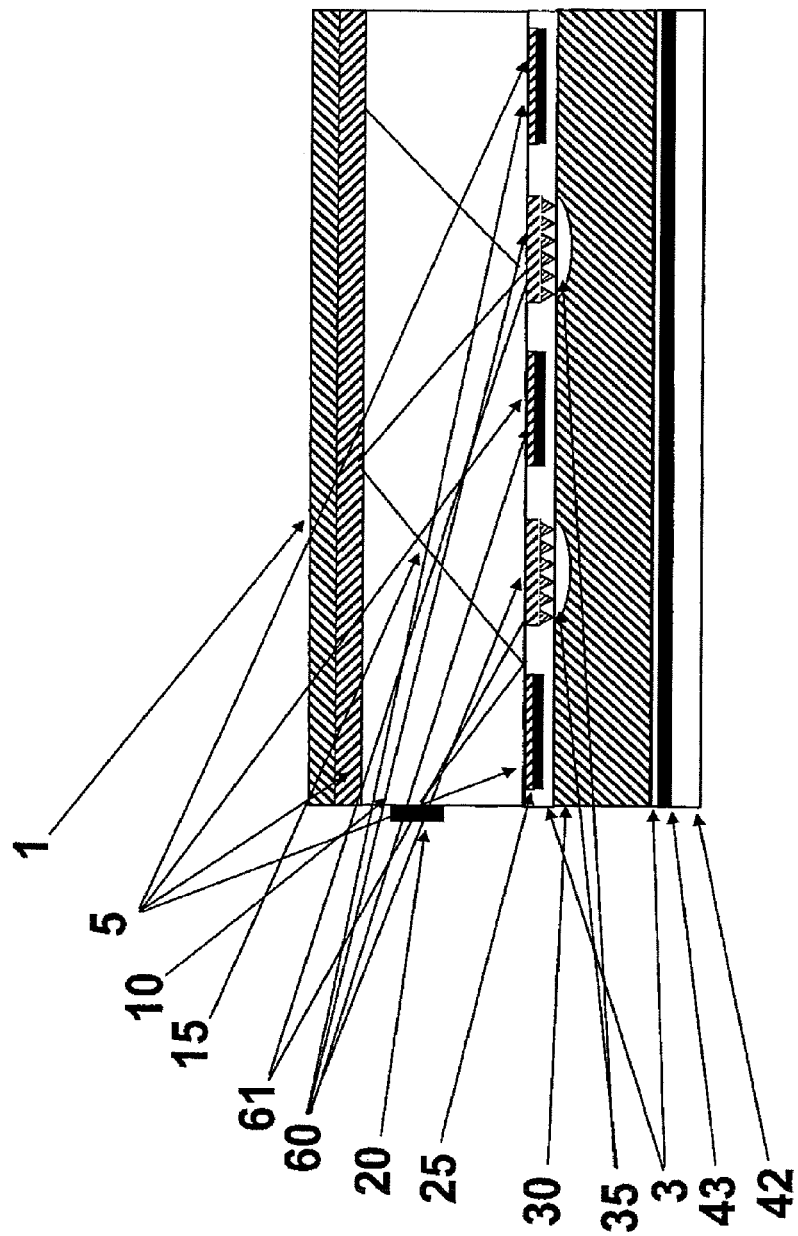
FIG. 14 shows a Lightgate in the shape of a torus in shut state.

FIG. 14 shows a Lightgate in the shape of a torus in shut state. The torus lightgate design is a particular embodiment of either a push & push lightgate or a push & flush lightgate.

In the first case with a push & push design the less polar liquid 35 will remain with the same centre point but expand into aperture 96 area outside the low n island 60 that in this connection is an atoll or contract onto the atoll such as it is shown in the figure.

Figure 15:
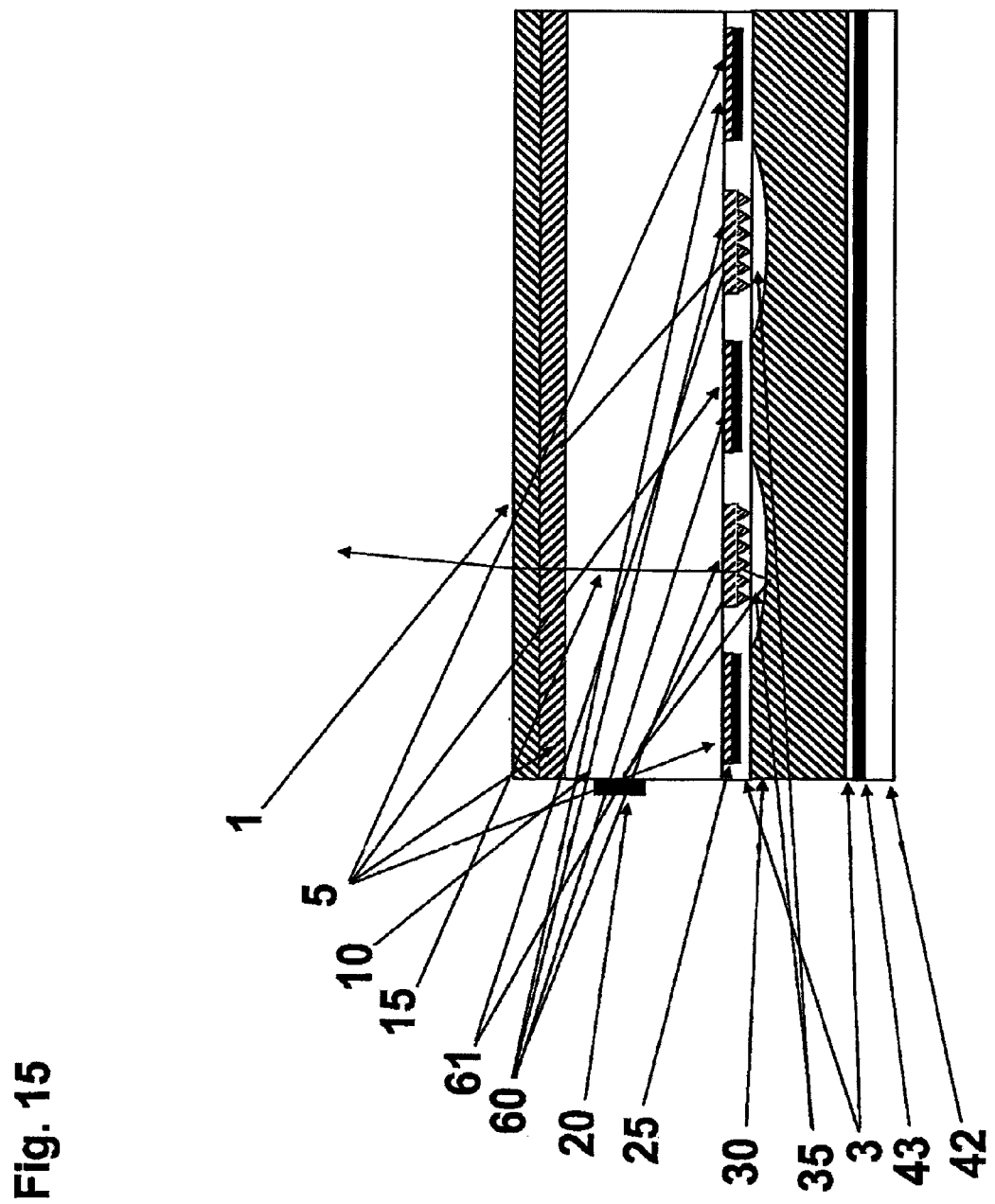
FIG. 15 shows a Lightgate in the shape of a torus in open state.

FIG. 15 shows a Lightgate in the shape of a torus in open state.

The less polar liquid 35 is expanded into the aperture 96 area which in this particular design also covers part of the lagoon inside the atoll. Due to the geometry of the torus design it is feasible to design a large omni directional lightgate with small feature sizes in the important lateral dimension.

Figure 16:
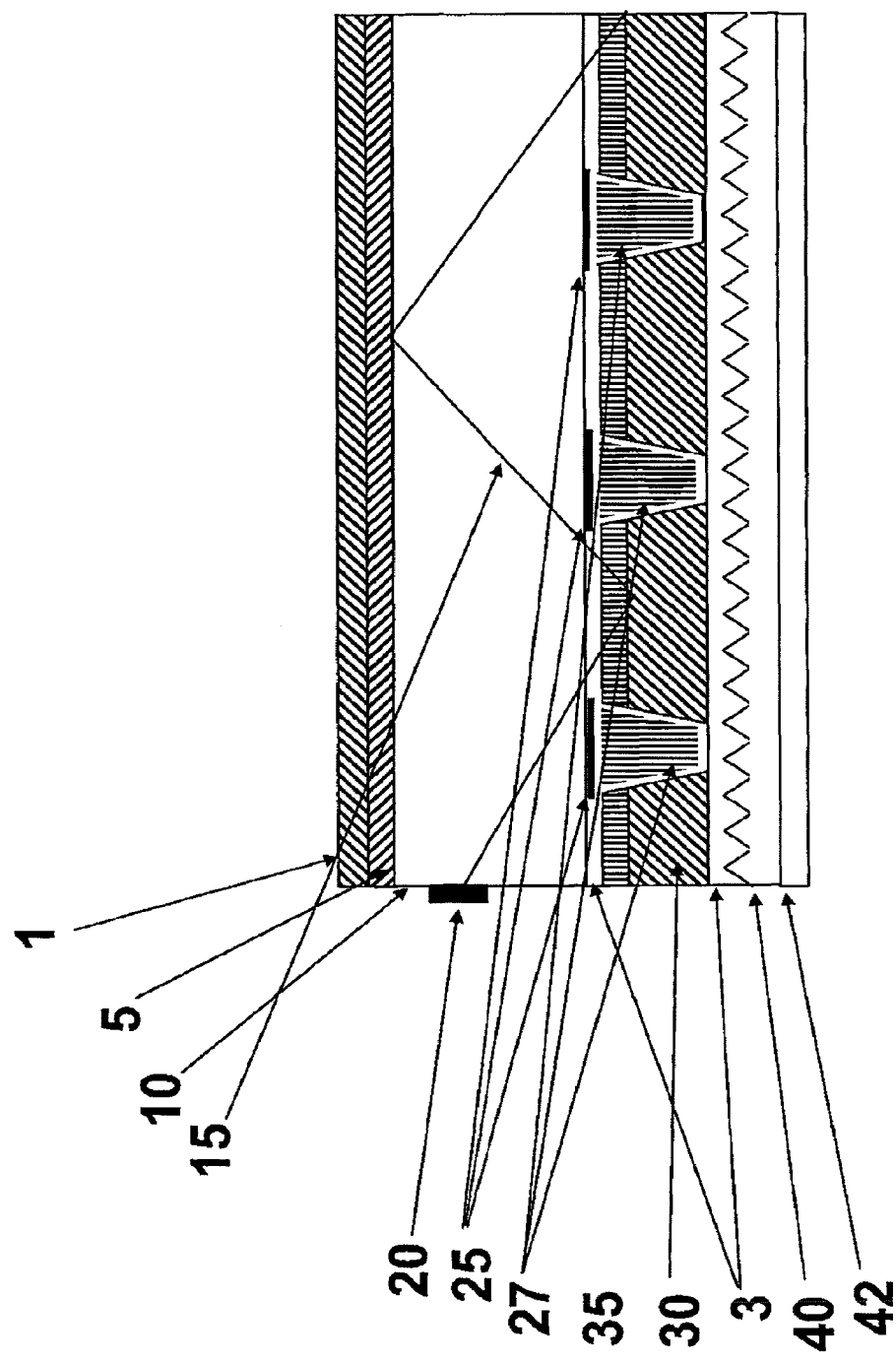
FIG. 16 shows a Lightgate with conductive spacer dots in shut state.

FIG. 16 shows a Lightgate with conductive spacer dots in shut state.

The spacer dot design introduce the spacer dot electrode 27 which as the figure show protrudes up through a layer of less polar liquid 35 covered with a layer of dipolar liquid 30. The boundary between less polar liquid 35 and dipolar liquid 30 is in balance around the spacer dot electrode 27 because the surface energy of the spacer dot electrode 27 average the surface energies of the less polar liquid 35 and the dipolar liquid 30. If the balance is not perfect the interface between less polar liquid 35 and dipolar liquid 30 around spacer dot electrode 27 will show a topology change. Any topology change will result in TIR and FTIR outcoupling from the electrowetting optical device. If however the balance between less polar liquid 35 and dipolar liquid 30 is not right it is possible to feed a bias charge to spacer dot electrode 27 that will recreate the balance and thus enable a waveguide 10 which partly consist of the less polar liquid 35.

Figure 17:
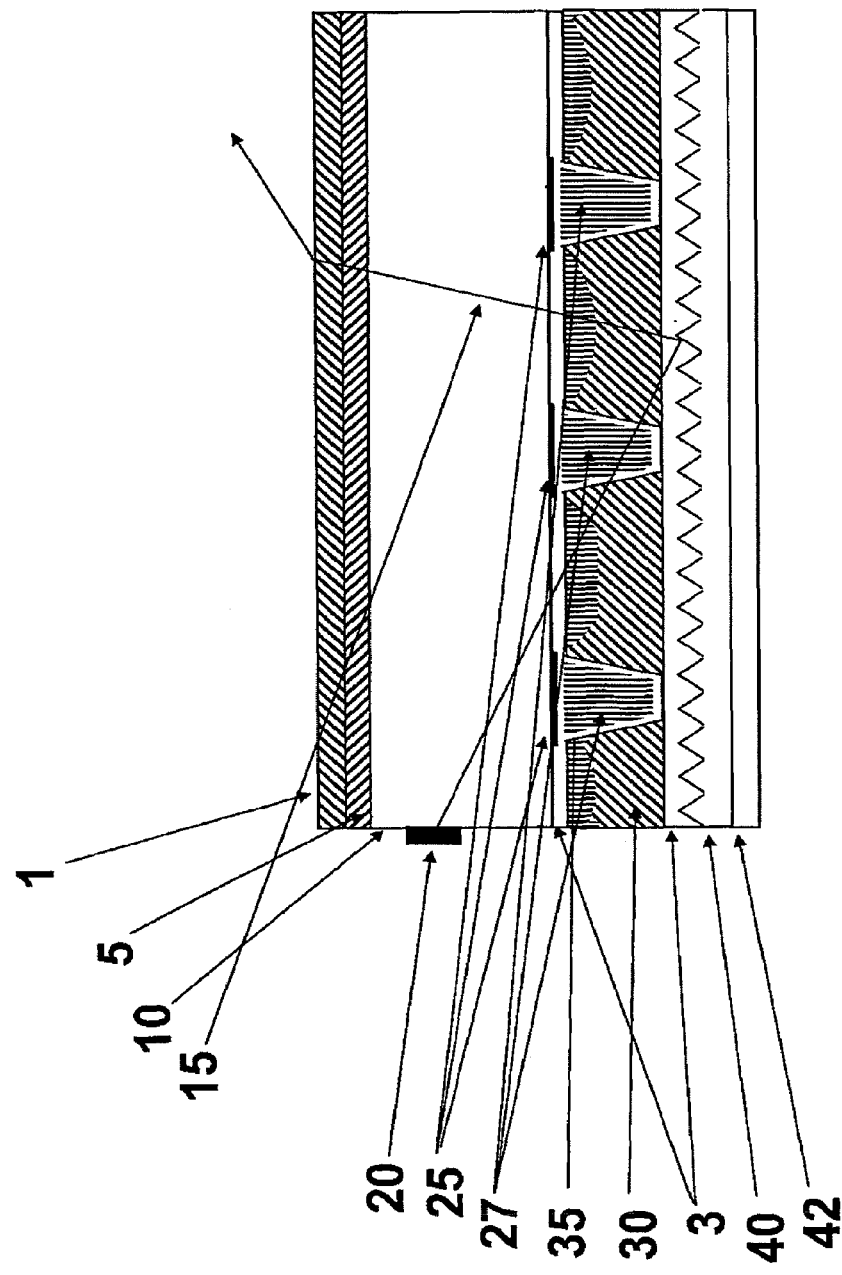
FIG. 17 shows a Lightgate with conductive spacer dots in open state.

FIG. 17 shows a Lightgate with conductive spacer dots in open state.

When charge is applied the boundary between the less polar liquid 35 and the dipolar liquid 30 around the surface of spacer dot electrode 27 shifts position which result in a topology change that create TIR and FTIR outcoupling from the waveguide 10. The outcoupled light will move either towards mirror electrode 40 where it will be reflected upwards through the waveguide 10 or it will move upwards through the waveguide 10. As the spacer dot electrode 27 provides an upright surface for the competitive electrowetting the demanded change in contact angle for the two fluids is rather small relative to the topology change which result in a system that require rather low electric field strength change to output light from the waveguide 10. The spacer dot electrode 27 cause constant light leakages from the waveguide 10 because they are constant imperfections in the waveguide.

The leakages effect makes the spacer dot design usable for illumination only whereas the design is less useful for display application say for backlight.

Figure 18:
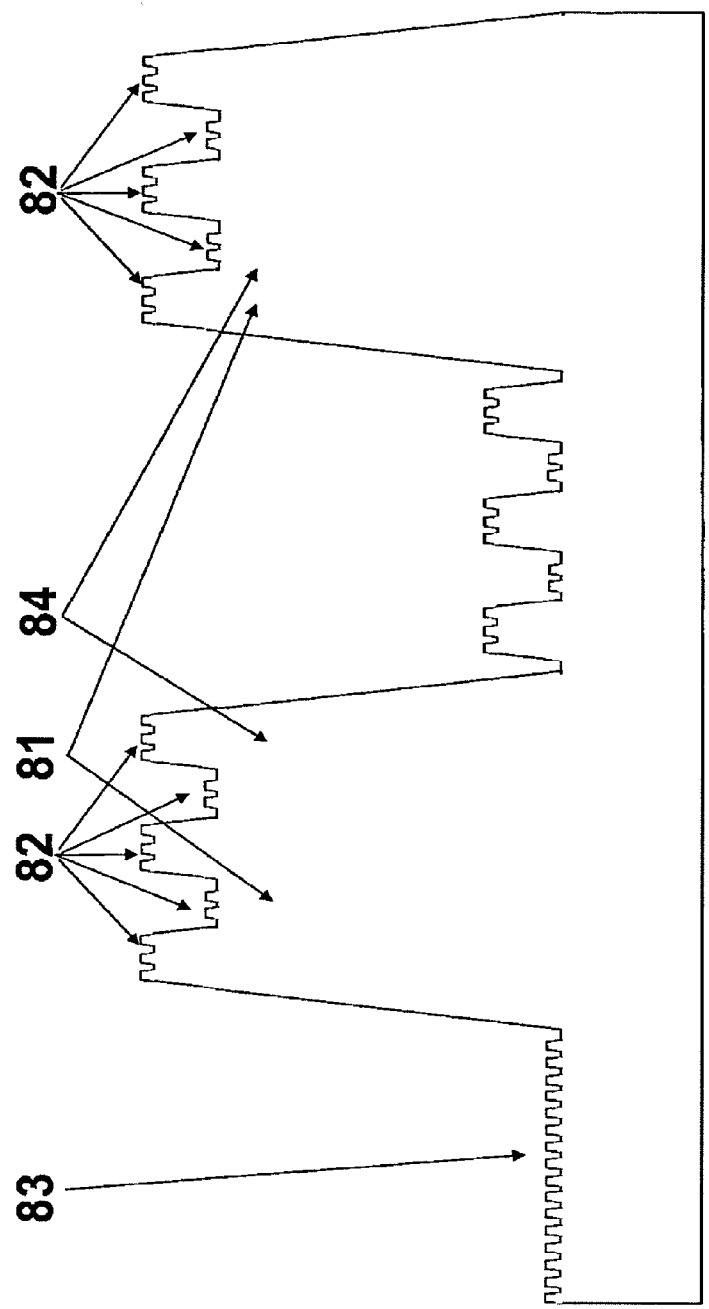
FIG. 18 shows a nanoimprint with characteristics usable to produce lightgates.

FIG. 18 shows a nanoimprint with characteristics usable to produce lightgates. There are two ways to produce surfaces with controlled hydrophilic/hydrophobic/oliophilic/oliophobic/refractive indices surfaces. The first approach utilizes print of different materials inherent surface properties and the second approach engineer surface properties by use of nanostructures created by nanoimprint techniques.

The approaches can be combined and will indeed always be a combination for nanoimprint solutions as the surface characteristics inherent to materials always will play a role for nanoengineered surfaces.

The print process needed in the inherent properties set demands for a good alignment which are difficult to attain. Therefore the feature size must be enlarged which slow down lightgate switch speed. Also the yield is depending upon many different materials being able to adhere to each other which is a complication. The dielectric layer required has to be beneath the surface property controlling materials unless the characteristics of the dielectric layer it self is useful in the construction and therefore the electric field strength will be lessened which also cause slower lightgates and require higher voltage applied to achieve the electrowetting actuation of the two fluids.

The nanoimprint approach creates special nanostructures that control the surface characteristics. If the nanostructure of a material is controlled the inherent surface characteristics are changed. As the nanoimprint is done in a single process step there is no alignment issue between the surface characteristics which entails that smaller feature size is attainable. The alignment between electrodes and surface characteristics is how ever still critical and so is the integrity of both electrodes and the dielectric layer 3.

The dielectric layer 3 is important for preserving the electric field strength. Tantalum dioxide, Hafnium dioxide and Silicon dioxide are usable alternatives. Especially Tantalum dioxide and Hafnium dioxide are interesting due to high dielectric constants that allow layers as thin as 20-40 nm to be used which is both an advantage for the electric field strength and for the optical performance of the electrowetting optical device because a layer that thin will not be seen by passing radiation as a material with a refractive index.

The hydrophilic structures 83 are used in lightgate design to contain less polar liquid 35 simply by providing a surface where dipolar liquid 30 which is usually water based will have an affinity for whereas less polar liquid 35 which is usually oil based will deter. The refractive engineering structures 84 function by mixing two materials with different refractive indices together such that light will see the layer with mixed materials as a layer with the combined refractive index of the two materials respective refractive index. The diffractive structures 81 are large light controlling structures that always require print process to be created in a controlled fashion. The hydrophobic structures 82 are used to attract the less polar liquid 35. It should be noted that other particular surface properties such as oliophilic, oliophobic also can be created by nanoimprint and that surfaces that combine the different surface properties can be created too such as a surface that is both hydrophobic and oliophobic and refractive index engineered and fitted with diffractive structures. Also the different properties can be controlled such that they are not only blended together but also such that it is feasible make the different properties weaker or stronger according to specific design preferences. The reason for this versatility is the difference of scale of the different structures.

A key advantage of nanoimprint is that it is benign for thin film processing. In a preferred embodiment the waveguide 10 is a thin film with printed structures that create a hydrophilic area that is also oliophobic such that it can contain areas where the less polar liquid 35 will attach it self to, areas with low n refractive index that are also hydrophobic and oliophilic such that less polar liquid 35 will attach it self to it and at the same time will be prevented from optical interaction with light trapped by TIR inside the waveguide 10, areas with a refractive index matched to the less polar liquid 35 and the waveguide 10 that are also hydrophobic and oliophilic such that less polar liquid 35 will attach it self to it and be able to interact optically with light trapped by TIR inside the waveguide 10. These three kinds of areas with different grades of the properties are sufficient to design the disclosed lightgate designs. In the preferred embodiment electrodes and the dielectric layer 3 are situated on top of the nanoengineered structures but it should be noted that the both the electrodes and the dielectric layer 3 can be placed on the other side of the thin film. Also the thin film can be made from PET or another polymer suitable as a dielectric layer 3.

The production process could be as follows:

A thin film is cladded with photo resist.

Structures are imprinted into the photoresist with a stamp containing nanostructures and microstructures.

UV curing is done while the stamp is in contact with the photoresist.

On top of the structures a conductive surface is deposited.

The conductive surface is cladded with a photoresist.

The photoresist is masked and developed.

The undeveloped photoresist is removed.

The conductive surface not protected by photoresist is lifted off.

The photoresist above the conductive area is removed.

The dielectric layer 3 is deposited above the conductive area.

Anti Charge Trapping

The dielectric layer 3 is influenced by the presence of ions because the voltage across will attract ions and lead to charge trapping that will disrupt the electrowetting actuation. As a means of preventing the charge trapping long polymer chains that readily trap charges can be added to the water as a soluble or be printed to surfaces. Colloids are useful in this capacity.

Figure 19:
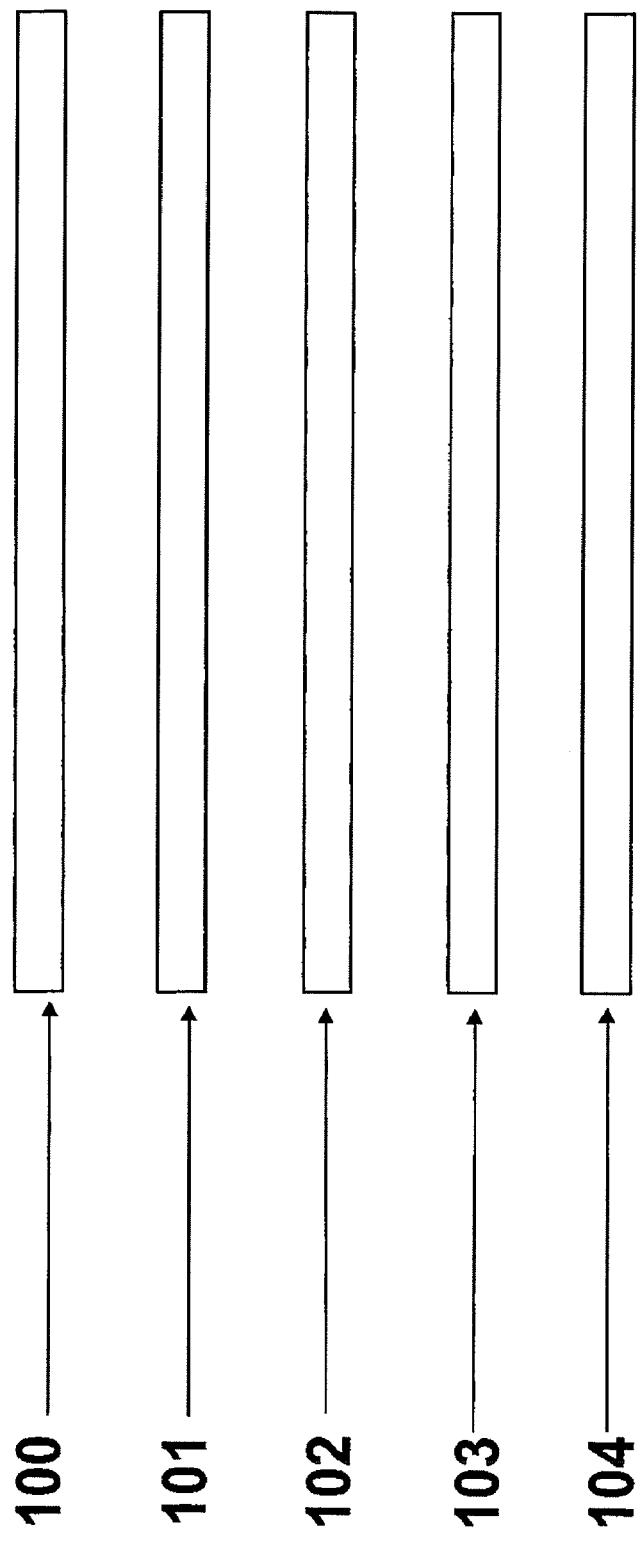
FIG. 19 shows a number of different layers that are applicable to modulate light extracted from the waveguide.

FIG. 19 Auxiliary Layers

It is feasible to insert auxiliary layers in the electrowetting optical devices below the top surface 1 to control the emission of light.

By employing the phosphors 100, beam shaping optics 101 and/or LC elements 104 in combinations with the described electrowetting optical devices it becomes feasible to create various applications.

An example of such an application is a scanning backlight where a phosphor 100 layer can be placed above the low n cladding 5 over the waveguide 10 and beneath the top surface 1. The scanning backlight application can be realized with all types of electrowetting optical devices where the lightgates stretch the entire length of either a row or a column. The phosphor layer will convert short wavelengths from the light source 20 to visible spectrum which enables the use of high brightness UV LED's that are very much more efficient than primary colour LED's and very much more powerful. Further by separating the phosphors from the LED it becomes possible to avoid the mutually harmful heat generation inside both the LED chip and the phosphor layer and it becomes feasible to achieve better LED thermal management. Also it should be noted that the heat generation from the phosphors brings the temperature above the max for the LED chip earlier and thus reduce the max LED output. Also increased heat generation accelerate degradation of both LED chip and phosphors. It should however be noted that the electrowetting optical device is also adaptable to fluorescent tubes. As the phosphors are essentially isotropic the radiation will go in all directions but the low n cladding 5 has a low n that will TIR reflect the majority of the converted light in the direction toward the beholder. The part of the radiation that continues downwards can be recycled by use of mirror electrode 40.

When the converted radiation pass through the phosphor layer the phosphor layer will act as a diffuser. Above the top surface 1 a normal LCD design beginning with a DBEF film can be placed.

In another embodiment of the scanning backlight it is possible to extend the functionality with 101 beam shaping optics layer such as prism sheet or a diffractive optical element that control where light from a particular area of the phosphor will be directed. Combined with the area selective nature of the backlight design it becomes possible to select rows or columns that transmit light that spread in a wide viewangle or a narrow viewangle. This functionality is especially useful for power savings because the energy send in other directions than towards the beholder(s) is lost.

In an embodiment of the scanning backlight specific rows or columns lightgates select phosphor 100 layers below beam shaping optics 101 layer that direct emission to the left or to the right directions such that a scanning backlight that alternating output an image to the left eye and the right eye is realized and thereby a backlight that can convert any normal 104 LC element into a Liquid crystal display that can display stereoscopic content.

In an embodiment of the scanning backlight the rows that transmit left and right are subdivided into rows where the phosphors above exclusively convert UV into red light or green light or blue light such that it becomes feasible to remove the Bayer filter from the LCD and run it in colour field sequential mode. The Bayer filter consumes approximately 75% of the photons emitted from normal LCD backlight units so the advantage is significant. Also the number of pixels required in a 1.080×1.920 HDTV is lowered by a factor 4 when you switch to colour field sequential mode which allows the design to reduce the complexity even though an active backlight is added. Auxiliary lightgates with deep saturated blue and red phosphors can be added and used in specific frames to accentuate parts of images where extra saturated colours are desirable. Further the selected phosphors can be chosen for narrowband emission and through this increase the beholders perceived brightness through the Helmholtz kohlraus effect.

In an embodiment of the scanning backlight the rows also choose between phosphors with slightly different excitation spectra such that good match to the light source 20 output spectrum is achievable. To harvest the advantage a measure of the match between the LED emission spectrum and the excitation spectra of the phosphors has to be carried out and this can be done by adding one or more photo sensors to the top surface 1 and by either introduce slight topology similar to antiglare to the top surface 1 or by tapering the top surface 1 slightly such that a small portion of the light passing through the top surface 1 continue to the rim of the top surface 1 where photo sensors measure the energy. The best match is simply the match that makes the photo sensors output most energy. A further use of the photo sensors is to match the timing of the LED emission to the LCD update including the time span the phosphors require to respond with emission from when UV impinge upon them.

In an embodiment of the scanning backlight all the above options including are combined in a single package where there are also added lightgate rows or columns that select phosphors 100 beneath beam shaping optics 101 layer that output in either wide angle or narrow angle. If all the features are combined including wide and narrow view angle, RGB phosphors, two sets of phosphors with different excitation spectra and left and right optics elements then the design is required to have 2×3×2×2=24 lightgates in sequential repetition that choose different optical modulations according to the desires of the beholder. In order to avoid too large distance between the backlight unit the 24 repeated lightgates are made in a jig saw pattern.

Another consideration regarding possible Moiré effects dictates that the repetitive patterns in all layers above the phosphors should be varied such that Moiré patterns are avoided. The above different backlight designs are all feasible to combine with advanced algorithms that foresee the needed backlight intensity above each lightgate and this is of cause also feasible to do including the RGB colour field sequential mode. The intensity can be varied by pulsing the light source 20 in different duty cycles and/or by varying the energy applied to the light source 20 and or by varying the duration of a scan position. The latter will require that the scan rate of the LCD is co-controlled to match such that the scanning backlight continue to be on only where the LCD is actually updated. Above it has been detailed how a scanning backlight can be made with different levels of refinement. The same refinements can be employed in a dynamic backlight where the backlight is designed with a push & push active matrix ground selector 73 which enable addressing lightgates in a matrix behind LC elements 104. All the elements shown in the above scanning backlight application including selection of wide or narrow view angle, left or right emission, R or G or B colour field sequentially, saturated frames addition, matching of phosphors excitation spectra to LED's emission spectra can be utilized combined with active matrix selection of single lightgates which enable that the intensity of the backlight emission can be co-modulated by both the backlight unit and the LC elements 104 to match the dynamics required by the video content.

The backlight design principles are also employable in other applications such as for instance car headlamps.

In a car headlight the electrowetting optical device is required to:
Balance light according to the balance of the car that will affect the up down direction of the headlights.
Shift between close up light (naerlys?) and distance light and mist light and position light.
Turn lights into left and right curves.
set the headlights for left road driving or right road driving
Blink light left or right
Distribute intensity from the headlights such that the close field get less photons and the far field get progressively more in order to compensate for the distance law and though this enable best possible illumination of the road and obstacles ahead.
Show decorative elements in multiple colours All the above settings and more can be fashioned using the very same techniques as employed to create the scanning backlight. If we provide three different balance settings combined with near field lighting, far field lighting, mist lighting and position lighting combined with left road and right road settings combined with left turn and right turn settings+added blink light to both left and right then we in total need 3×4× 2×2=48 lightgates in repetition and as we want to add left and right blink light it is preferable to address active column lightgates.

In a headlight the top surface 1 needs to be very tough which is not a problem using for instance press glass or moulded polycarbonate as top surface 1. Mounting the headlight is very easy compared to standard headlights as the form factor provide low depth that allow a design where the car body only has small holes for electrical connection of the headlights. The employed beam shaping optics 101 layer can allow a very slanted profile that improves design aesthetics as well as aerodynamics. Also the before mentioned opportunity to create a curvable electrowetting optical device affords designers good opportunities.

In an embodiment of the invention the electrowetting optical device similar to the scanning backlight is utilized to create a tuneable LED that can output coloured light across the visible spectrum and also output white light with a Colour Rendering Index CRI>95% A normal high brightness UV LED has a fixed mix of phosphors that are co-located in close proximity to the LED chip and is therefore unable to tune the colour of the converted emission. When a batch of high brightness LED's is produced there will for many reasons always be a variation of the emission spectra and the lm/W. As white phosphors mixes usually require an accurate match to their excitation spectrum the LED's has to be sorted according to performance and especially according to emission spectra. The LED's that does not meet requirements are sold at a discount and the process steps required to sort the LED's into different bins is costly. The electrowetting optical device can employ all high brightness UV LED's in a batch and thus increase yield and lower costly sorting into different bins.

Due to the inherent accuracy of match between emission and excitation spectra based on computation of sensor readings it is feasible to match the same colour and intensity for a multitude of individual electrowetting optical devices. Most light sources loose efficiency over their lifespan and experience ageing degradation with colour temperature shift as well. LED's are no exception so it is almost impossible to have several LED based lamps in the same lighting design that output even colour and intensity which is a major problem for lighting designers. The built in sensors can also measure ambient light level in dark cycles between LED emissions and the tuneable LED can output light that is blended with the ambient light such that the light intensity is kept at a predefined level.

The CPU that calculate the colour match and the ambient blend is fitted with a transceiver running for instance Z-wave or Zigbee such that it becomes feasible to remote control the tuneable electrowetting optical device. This facility enable performance control where max output is probed by first matching CRI to a preferred level and second increase intensity until it reaches a peak output. When the max output is found the max output efficiency is probed by measuring when the best lm/W ratio with the preferred CRI is obtained by varying duty cycle, voltage and ampere. The information will be extremely useful for cost and environmental conscious facility managers because the tuneable electrowetting optical device should be replaced when it is too expensive to keep and not when it stops working. The equation needed to process in order to decide a replacement can be part of software supplied to the facility managers and can be kept updated via the internet so every time a novel electrowetting optical device with better performance becomes available as a consequence of the constant improvements of LED efficiency the equation changes and facility managers will be able to get a reliable payback time calculation that explain both the economics of replacement and the environmental benefits. Data collected to facility managers about tuneable electrowetting optical devices can be used to establish how real life lighting schemes are operated and based on these data research into different programming of the lighting can form the basis for further energy savings on a system basis.

The remote control enables users to set the light according to their wishes including colour temperature and intensity.

Proximity sensors commonly used in other lamps are also feasible to connect via the wireless communication or build into the tuneable electrowetting optical device. In the absence of humans in the proximity the response can be either to shut the light down entirely, to dim light or to set the CRI to a lower value where the lm/W ratio is better than for high CRI values.

In another embodiment of the invention the electrowetting optical device serve as a display. All the described lightgates shown in FIGS. 2 and 4 to FIG. 17 with different arrangements of the electrodes shown in FIG. 3 (except for c) will function in display applications but there are considerable differences in the performance of displays that employ the different lightgates. The push & flush lightgate type will when it expands increase the covered aperture area. The round and torus shaped push & flush designs increase area exponentially which is a better match to the logarithmic human vision system than linear pixels such as they are found in Plasma displays, Liquid crystal displays, OLED displays and other contemporary displays. Linear pixels have a problem with Grayscale because the uncertainty of applied charge and pixel performance is equally large regardless of the emission which means that the relative inaccuracy is significantly higher in low level emission where the human vision system is most adapt to register flaws. For an exponential lightgate such as the round lightgate best precision is achieved when a high amount of charge is utilized to push the less polar liquid 35 into high contact angles where it covers the least area of the aperture 96. As both the round and the torus shaped push & flush lightgates requires exact positioning of the less polar liquid 35 it is required to use active matrix to control the display. Differences in output can be mitigated by use of coupling sensors to the display either to each lightgate or to regions of the display and then compensate surplus or deficit output by time modulating the output from the lightgate over several frames. The time modulation also makes a better Grayscale feasible because the LED's can be driven in alternating intensity in sequential frames such that finer differences in intensity can be realized. Colour field sequential mode is feasible provided that at least RGB light sources 20 are connected to the waveguide 10. Frames with deeper saturated colours are feasible to insert in between the normal RGB frames provided light sources 20 with deeper saturated colours are attached to the waveguide. The deeper saturated colours will be employed to accentuate specific parts of the image.

All displays where the pixel fill factor is lower than 100% will close up show a pixilation effect and for round push flush lightgates design the fill factor has to be low to design a lightgate with sufficiently fast switch speed. To counteract pixilation a beam shaping optics 101 layer can be adapted to diffuse light from the lightgates and a 103 beam shaping optics layer2 can be adapted to control the viewangle. The appearance of the display will be that the pixels overlap seamlessly.

In another embodiment of the invention passive matrix push & flush lightgates are utilized to create a binary display based on passive matrix instead of the above described. All the colour field sequential mode techniques are applicable and so is the anti pixilation design. A passive matrix display is limited to only update a single row or a single column at a time. For HDTV 1.080 rows×1.920 columns have to be updated per frame. A 24 bit true colour mode will require 25.920 updates per colour sequential image frame. The number of updates can be lessened if the lightgates are operated as sub-pixels. Two lightgate pixels design half the needed updates and four lightgate pixels design half it once more. Floating pixels with varying numbers of lightgates are feasible. The binary principle requires that the lightgate is only to be in one of two states which are shut or open. In the push & flush design a binary state can be created by introducing a bias charge to rows that are not updated. The binary charge has to equal the force needed to push the less polar liquid 35 onto the low n island 60 shown in FIG. 8 where the lightgate is shut and at the same time be less than the maximal force needed to the push the less polar liquid 35 away from the far border of the aperture 96. The design rely on the less polar liquid 35 layer on top of the upper electrode 25 below the dielectric layer 3 to become a part of the dielectric layer 3 that due to its thicker dimension creates a lowered electric field strength that require a voltage difference higher than created by the bias charge to actuate the less polar liquid 35 that covers the entire aperture 96. The bias charge is able to push the less polar liquid 35 up upon the low n island 60 as long as the electric field strength is not limited by less polar liquid 35 thickening the dielectric layer 3 so once a lightgate is shut the time before the bias charge has to be applied equals the time required for the first updated to flush the less polar liquid 35 back past the upper electrode 25. The bias charge can only be applied when the lightgate is either shut or open. Therefore in push & flush designs it is required not to begin the update of lightgates before the last aperture 96 is fully covered by less polar liquid 35. Then by applying charge to the upper electrode 25 the less polar liquid 35 is pushed onto the low n island 60. In order to prevent less polar liquid 35 flush it is feasible to apply charge to all upper electrodes 25 while all push & flush row selector electrodes 70 are charged with bias charge.

In another embodiment of the electrowetting optical device the push & push design shown in FIG. 10 and FIG. 11 is employed. The flush to cover the aperture 96 is speeded up by an additional upper electrode2 26. The differential drive scheme described can be employed.

In another embodiment of the electrowetting optical device the push & push design shown in FIG. 12 and FIG. 13 is employed. Due to the barrier 63 area that is slightly less oliophobic than the oliophobic 62 areas surrounding the lightgate the less polar liquid 35 will be contained either upon the aperture 96 or the low n island 60. When the less polar liquid 35 is in transition from either side across the barrier 63 then either of the sides which the less polar liquid 35 is most in contact with will draw the less polar liquid 35 across the barrier 63 even though the charge is annulled. This self completion effect reduces the time needed to update the lightgate and due to the binary nature of the system no bias charge upon the push & push row selector electrode 71 is required. The binary state enables longer time to fire light source 20 energy through the lightgates.

In another embodiment of the electrowetting optical device the push & push design shown in FIG. 12 and FIG. 13 is employed together with a push & push active matrix ground selector electrode 73 shown in FIG. 3 d. In this design the switch speed required is lowered because only a total of 48 sub-frames are needed to create one frame with 24 bit true colour. First upper electrode 25 and upper electrode2 26 select whether the next update open or shut the lightgates and then the push & push active matrix ground selector electrodes 73 select which lightgates should to be updated. Second the potential of upper electrode 25 and upper electrode2 26 is reversed before push & push active matrix ground selector electrodes 73 select which lightgates should to be updated. The lightgates that needs no update is left unaltered.

Figure 20:
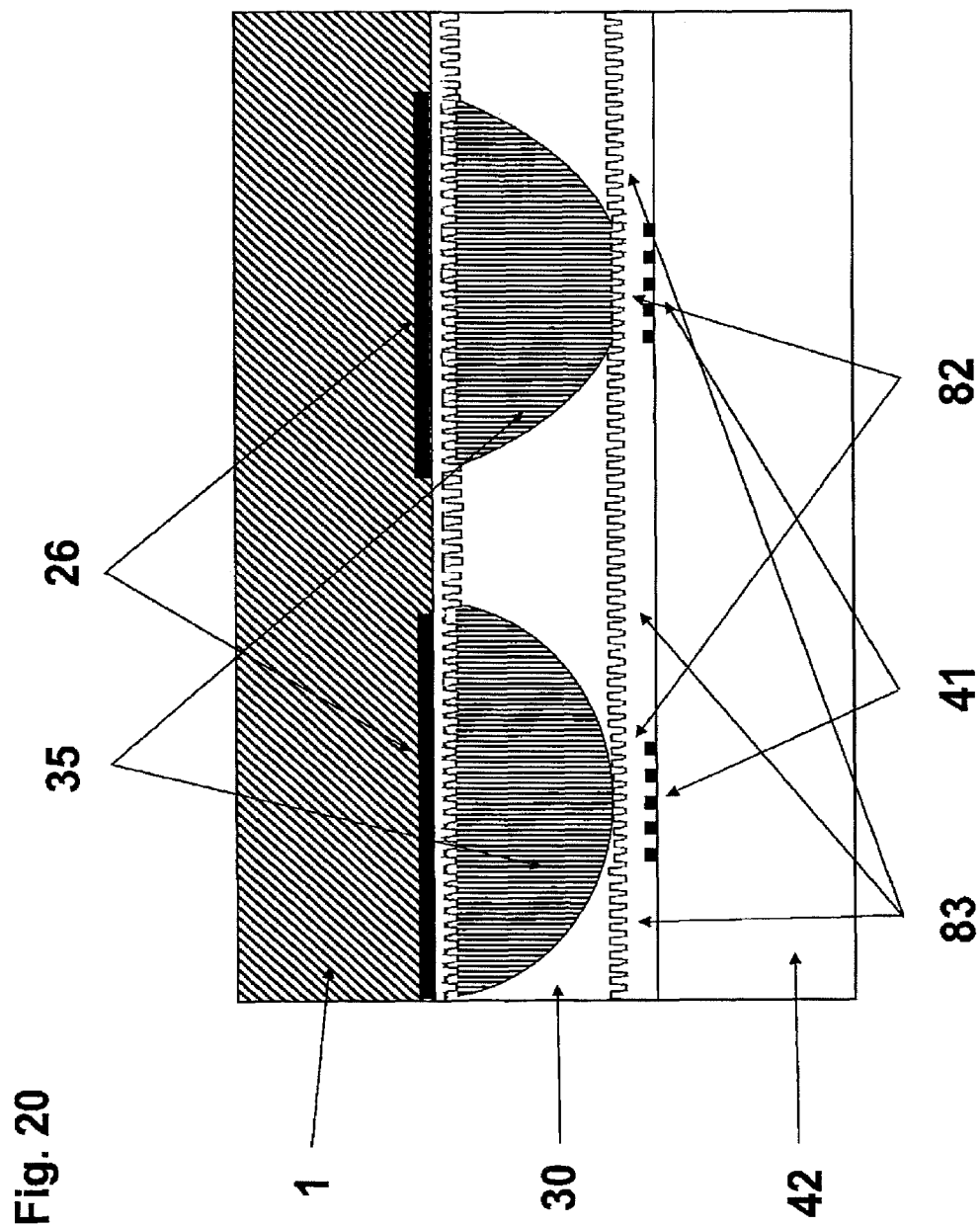
FIG. 20 shows a lightgate with inverted droplet in shut and open state and FIG. 20.1 shows a lightgate with inverted droplet in (a) open and (b) shut state.

FIG. 20 shows a lightgate with inverted droplet in shut and open state. The top surface 1 has a cladding with hydrophobic structures 82 that attach the base of a droplet with less polar liquid 35 to the top surface 1. The hydrophobic structures 82 that serve as aperture 96 areas are divided by hydrophilic structures 83 that prevent the less polar liquid 35 to attach there. By controlling where the respective hydrophobic structures 82 and hydrophilic structures 83 are printed the form of less polar liquid 35 droplet in contact with the top surface 1 can be designed. The upper electrodes 26 are connected galvanically to the less polar liquid 35 that is made conductive by use of filler materials based on carbon nano tubes or large polymer chains molecules containing carbon. The surrounding dipolar liquid 30 is made electrically insulating by removing ions which will make the dipolar liquid 30 a poor electric conductor. The lower electrodes 41 area made such that each row is subdivided into an uneven number of electrodes that are aligned. The aligned electrodes are addressable such that every second electrode can have a potential that is different from the immediate neighbouring electrode in a row while the outer electrodes in a row always are equal to the outer electrodes of adjourning row electrodes when the adjourning rows are of.

When the aligned electrodes in a single row are addressed with different electric potentials horizontal electrowetting will draw water to aperture 96 areas that are created by nanoimprinting of hydrophobic structures 82 that are surrounded by hydrophilic structures 83. The form and extent of the aperture 96 areas can vary. The aperture 96 areas and the low n island 60 area created by spin coating a low n cladding material onto the waveguide 10 and then nanoimprinting hydrophobic structures 82 such that the low n low n cladding 5 material becomes so thin in the aperture 96 areas that the combined refractive index of the low n low n cladding 5 layer, the ITO lower electrodes 41 layer on top of the nanoimprinted structures and the dielectric layer 3 and the less polar liquid 35 match the refractive index of the waveguide 10. The low n island 60 is in fact as shown in FIG. 20 a surrounding "sea" consisting of hydrophilic structures 83 that attract dipolar liquid 30. The low n island 60 area is co-produced in the same low n low n cladding 5 and the same nanoimprint process by applying nanoimprinted hydrophilic structures 83 on top of a low n low n cladding 5 layer that is sufficiently thick to maintain the low n of the low n cladding 5 and thus create a critical angle between the low n low n cladding 5 and the waveguide 10 that will prevent light trapped by TTR inside the waveguide 10 from exiting via low n island 60 areas.

When the lightgate is addressed with a potential difference laterally between the aligned lower electrodes 41 it will be shut as shown in FIG. 20.1 b.

When the aligned electrodes in a row all have the same electric potential the row can be addressed through the upper electrodes 25 in the column direction because electric potential difference will drive the electrowetting and shut the lightgate as shown in FIG. 20.1 a. and equal electric potential will open the lightgate as shown in FIG. 20.1a. When the electrowetting is on all surfaces including the aperture 96 areas are wetted as shown in FIG. 20.1 b. and the added dipolar liquid 30 layer will lower the refractive index such that radiation trapped by TIR inside the waveguide 10 will not exit. When all electrodes 41 in the row have equal potential and the 26 upper column electrode also have an equal potential the aperture 96 areas will be index matched to the less polar liquid 35 and the waveguide 10 such that radiation inside the waveguide 10 can enter into the less polar liquid 35. When the radiation enters into the inverted droplet of less polar liquid 35 it will be reflected by TIR at the walls of the less polar liquid 35 because it is bordered by dipolar liquid 30 which is low n such as water. The hydrophilic structures 83 will constantly be flooded with a dipolar liquid 30 which serves as a reservoir for the 82 hydrophobic areas that draw dipolar liquid 30 when the lightgate is shut as shown in FIG. 20.1 b. Shutting the lightgate by increasing the thickness of the dipolar liquid 30 layer is dependent upon the wavelength of light to be shut of. The longer the wavelength light the thicker the layer needs to be in order to TIR reflect light and therefore also the corresponding volume of dipolar liquid 30 that has to be moved increase with wavelength. Volume movement is part of the equation that determine how fast the lightgate can be operated it follows that the lightgate is speedier for short wavelength light and thus better adapted for blue and UV wavelengths.

Movement of the droplet with less polar liquid 35 is also part of the equation and in this design the movement is minimized to a theoretical minimum by holding the less polar liquid 35 droplet still in the lateral plane while only moving a few nanometers up and down in the vertical plane. The result is that the relative speed of fluids is limited to a minimum which prevent friction between the liquids and the thereof following mixing of the liquids that can create emulsion which basically resemble mayonnaise. The emulsion risk is an upper speed limit so the operation of shutting and opening the lightgate is increased to a maximum via this design. The emulsion risk can be reduced by selection of liquids that are mutually repellent and by selecting liquids with near identical density and by selecting liquids with as little as possible solubility in each other.

The aperture 96 areas can be dispersed across an area such that each aperture 96 is in fact an island within a sea consisting of an area that does change wettability. When the there is a potential difference driving the electrowetting effect only the wetting of the aperture 96 areas will be affected such that a change in refractive index occur. The nano imprint structures that create the differing hydrophobic and hydrophilic properties can be optimized to be filled with dipolar liquid 30 rather than with less polar liquid 35. Multiple aperture 96 areas creates the least possible travel distance over ground and relative to the inverted droplet lower contact area shown in FIG. 20.1. The shown aperture areas are round but there are in fact no limiting factors that prevent the from having different forms and from an optimization of least speed over ground perspective the cross section of the aperture 96 areas should be as small as possible whereas the length does not matter since it is the shortest distance from the edge to the centre that counts.

The inverted droplets shown in FIG. 20 are dimensional stable in themselves but the dimension stability can be enhanced by inserting an oliophilic spacer, similar to the description of FIG. 1, inside such that the top surface 1 and the waveguide 10 cannot be pressed together. When no vertical pressure is applied to the unit the top surface 1 and waveguide 10 will float on a film of less polar liquid 35.

FIG. 21 Shows a Illumination Unit 270.

A number of layers shown in top view in FIGS. 21.1, 21.2, 21.3, 21.4, 21.5, and 21.6 with different functions are stacked and assembled with high precision alignment due to alignment markers 240 that are either cut in the surface or drilled through the layers surfaces using laser or high pressure water cutting. The protective upper surface 230 shown in FIG. 21.5 seals the illumination unit 270 upwards. The lower surface of the protective upper surface 230 is preferably plane while the upper surface of the protective upper surface 230 can have any form desired. At the lower side of the protective upper surface 230 one or more thin layers can be deposited including phosphor 100 layer, beam shaping optics 101 layer or auxiliary layer 102 and the order of their relative position can vary according to purpose. The upper surface may be contoured with macro and micro prisms, diffractive optics, contour text, and may comprise thin layers that for instance apply scratch resistance, graded index match to prevent avoid Fresnel reflections, hydrophobic or hydrophilic properties, absorptive colour filter text or ornamentation and interference filters.

The top surface 1 shown in FIG. 21.3 may comprise beam shaping optics 101 that may consist of a layer with micro prisms or 81 diffractive optics structures, and/or phosphor 100 layer that convert short wavelength light to visible wavelengths and/or a layer patterned with upper electrodes 26 and/or a layer patterned with a dielectric layer 3. The top surface 1 may be produced of any transparent material but due to considerations regarding thermal expansion it will be advantageous if it has similar temperature dependent expansion as the waveguide 10 material shown in FIG. 21.1 and preferably as little expansion as possible. Also the material should preferably be a thermal conductor as it is important that the heat generated inside the illumination unit 270 can be dissipated. Materials such as fused silicon and Pyrex glass fit the requirements but also other glass types and polymers are usable. At the lower side of the top surface 1 a barrier layer 210 shown in FIG. 21.4 comprising a sheet of glass or polymer featuring alignment markers 240 matching the other layers in the stack and a open cut matching the zone where the electrowetting lightgates are positioned and a rim that covers the outer perimeter of the waveguide 10 in such as fashion that the barrier layer 210 constitute a solid evaporation barrier 90 containing the fluids active in the competitive electrowetting lightgates. The waveguide 10 comprise a low n low n cladding 5 material that provide a critical angle between the waveguide 10 and the low n cladding 5 except in the aperture 96 areas where there should be index match between the less polar liquid 35 the aperture area and the waveguide 10. One way to achieve this is to contour the low n low n cladding 5 such that surrounding the aperture 96 areas the low n cladding 5 is thick enough to provide a low n while the low n cladding 5 in the aperture 96 areas is thin enough to blend with other layers to form a mixed refractive index that match the refractive indices of the waveguide 10 and the less polar liquid 35. The contouring of the low n low n cladding 5 can be done by imprinting. Alternatively the contouring to create index match between the waveguide 10 and the aperture 96 and the less polar liquid 35 could be done by applying a PMMA photo resist in a spin coating process to the entire waveguide 10 above the low n cladding 5, UV cure the resist around the aperture 96 areas and remove the photoresist above the aperture 96 areas. For better adhesion of the low n low n cladding 5 a primer can be used on top of the waveguide 10 and for better adhesion between the low n cladding 5 and the PMMA photoresist a plasma etch of the low n cladding 5 can be used or a thin layer of material in the 10 nm range such as Hafnium dioxide can be added.

The waveguide 10 comprise 82 hydrophobic and 83 hydrophilic areas that defines the lightgates and surrounding passivated hydrophilic areas that will not accept other than dipolar liquid 30 which can be made by nanoimprinted structures. PMMA is well suited for nanoimprint and the UV curing described above can be made such that the PMMA is soft due to incomplete curing which may enhance the nanoimprint quality as well as the speed with which it can be performed. After the nanoimprinting or indeed while the nanoimprint stamp is in contact with the PMMA the UV curing can take place. Alternatively to creating hydrophobic and hydrophilic properties by nanoimprinting either hydrophobic or hydrophilic structures can rely on inherent properties of the dielectric layer 3 and these properties may be accentuated or manipulated by adding chemical impurities to the dielectric layer 3 as for instance is well known with silicon dioxide where an increase of carbon impurities create a hydrophilic surface. The waveguide 10 further comprise electrodes 41 below the dielectric layer 3 that are typically either rows or columns. The electrodes 41 for transmissive displays are usually made out of transparent materials such as ITO that is widely used in the display industry due to its transparent properties and well known controllable qualities. The electrodes 41 are applied by for instance a sputtering process whereafter photo resist is spin coated onto the electrodes 41 and thereafter patterned using UV lithography, thereafter the none UV cured photoresist is removed, thereafter the exposed 41 electrode layer is etched away, thereafter the remaining photo resist is removed and finally the waveguide 10 is rinsed and dried before further process steps which will leave the waveguide 10 with row electrodes in any of the forms described in the present patent application. In order to fortify the quality and conductivity of the electrodes 41 it is feasible to insert a electroplating process where a solution with ions is poured on top of the waveguide 10 whereafter the electrodes 41 are charged with a potential that attract ions to the electrodes 41 and thus increase the electric conductivity. After the electroplating the waveguide 10 is rinsed and dried. The waveguide 10 also comprise a dielectric layer 3 which is preferably made from a material with as high as electric constants as possible and as good an integrity as possible with as thin a layer as possible because the electric field strength that drives the electrowetting process depend on these qualities. Further the transparency is important even though the layer may only span 20 to 40 nm. Alternatives are among others hafnium dioxide, Tantalum dioxide and silicon dioxide. The dielectric layer 3 serves an important purpose by toughening the nanoimprinted structures as well as the ITO. When the waveguide 10 is readied in the above process it can be in the form of a sheet of glass or polymer or in the form of a roll of glass or polymer and many waveguides 10 for illumination units 270 may be cut from the sheet or roll employed. Cutting the waveguide 10 can be done with a number of high precision techniques such as water cutting or laser cutting. The key property of the cut is that the cut leaves a perfect edge because the edge of the waveguide 10 TIR reflects the revolving photons inside the waveguide 10 shown in FIG. 21.1. The underside and the edges of the waveguide 10 does not require any low n cladding 5 as it will be bordering air with a refractive index at 1 which decrease the critical. At the edges the combined angles x, y & z act together which allow photons to be TIR reflected even though the x,y angle is below the critical angle. The waveguide 10 design shown in FIG. 21.1 is roundish and in a round planar waveguide each reflection of incident radiation will in the x,y plane be determined by the tangent to the circular form and as the edges are slightly skewed relative to a perfect circle by the addition of appendices 250 that for stability each reflection increase the angle in x,y plane. Appendices 250 can be connected to the sheet of glass or polymer that the waveguide 10 is cut out of. The various layers of glass or polymer that the illumination unit 270 consist of can comprise 240 alignment marks in the form of holes, marks etc. that ensure assembly with perfect alignment to other sheets of glass or polymer that are laminated to construct the illumination unit 270. To each of the appendices 250 a light source 20 can be connected and the light sources 20 can be either of same wavelengths or different wavelength. The preferred lightgate design for outcoupling of radiation is the inverted droplet outcoupling shown in FIG. 20 and FIG. 20.1 a. & b because this design has a high outcoupling efficiency and because light that is not outcoupled through the apertures 96 continue in the same optical pathway which ensures that photons will stay strapped inside the waveguide 10 until they exit via apertures 96. All other lightgate designs allow photons to enter and output a percentage of the entered photon while a percentage is returned into the waveguide 10 where it may bounce in different angles. The reason why photons once injected via one or more 96 appendices into the waveguide 10 by one or more light sources 20 will not exit except through apertures 96 is that the round form with appendices 250 pointing backwards relative to the direction photons spin around in the waveguide ensures that the photons once injected will be TIR reflected by all surface except when it comes to the apertures 96. Other lightgates described in the present innovation are feasible to employ but are not preferred because the diffusive property of the lightgates with respect to non outcoupled photons will require mirroring below and at the edges to ensure that the scattered photons that are not outcoupled can be directed to outcouple. While it is entirely feasible to position high quality mirrors at the edges and surfaces it is however a complexity in the design and relative to TIR mirrors constitutes a loss factor. Usually a photon injected into a round waveguide will gradually be reflected in more and more open angles until it nears the most open angle possible inside a circle. The design requires that we also find place for solid evaporation barrier 90 and fluid evaporation barrier 91 shown in FIG. 1. The connected appendices 250 which will throw photons into a spin inside the waveguide 10 that is more centralized with fewer bounces per circulation. In one embodiment the light sources 20 can be visible colour light sources and the colour and intensity of the emission from the illumination unit 270 can be controlled by mixing the photons from each of the light sources 20 to blend a desired colour with a desired intensity. The light sources 20 in this set up may comprise light sources 20 that emit white light with different colour temperature. The TIR mirroring inside the inverted droplets avoids prismatic effects and ensures that the light will blend such that the emitted light comes from the same points without colour fringing phenomenons. The light from the illumination unit 270 will be emitted from a ring at the perimeter of the rounded waveguide 10 and the directionality of the light will match the predominant direction of the light circulation inside the waveguide 10 so it will be very predictable where the light will be emitted. The predictability of emission is well suited for a beam shaping optics 101 layer. The beam shaping optics 101 layer can be placed at the top surface 1 and be either diffractive optic structures or micro prisms. The beam shaping optics 101 diffractive structures 81 can be combined with nanoimprint of hydrophobic structures 82 and hydrophilic structures 83 necessary for the inverted droplet lightgate design shown in FIG. 20 and in FIG. 18 it is shown design that a nano imprinted surface can combine hydrophobic 82, hydrophilic 83 and diffractive structures 81. An alternative is to place the hydrophobic structures 82 and hydrophilic structures 83 at the lower side of the top surface 1 facing towards the inverted droplets and the diffractive structures 81 at the opposite side of the top surface 1 with the advantage that the diffractive structures 81 can be more efficient if they are not combined with hydrophobic structures 82 and hydrophilic structures 83 and if they are made from high index material that border air. Further by placing the diffractive structures 81 at the upper side of the top surface 1 it is feasible to use the top surface thickness as a spacer part of the optical system which will result in disintegrate the emission into various angles that could be optimally handled by diffractive structures 81 aligned to received light in specific angles. In another embodiment the light extracted from the waveguide is UV and phosphor 100 layer is positioned to convert the UV light to visible light. In this embodiment the phosphor 100 layer can be added as an inserted layer of it own. The phosphor 100 can be arranged with a palette of phosphors that emit different narrowband or wideband wavelengths and the phosphors in the palette can be adapted to have different excitation wavelengths such that if the short wavelength radiation emitted from the light source 20 vary in emission wavelength it will be possible to match the phosphor excitation to the LED emission as described previously. The phosphor 100 layer can further comprise areas that match lightgates but without phosphors such that primary light sources 20 can drawn out of the waveguide 10 without being diffused or absorbed by the phosphors. This will allow a blend of light from both phosphors and primary colour light sources 20 that will enable better blending possibilities and thus greater ability to blend the desired colours. As primary colours have longer wavelengths than for instance UV it is feasible to shut a lightgate for UV while it is kept open for visible light because the refractive index is depending upon wavelength and upon the thickness of the low n material providing the critical angle and upon the incident angle of the radiation. In the inverted droplet lightgate the shutter mechanism is a thin layer of dipolar liquid 30 injected in between the aperture 96 area and the less polar liquid 35 inside the inverted droplet. The thickness of the dipolar liquid 30 layer will first block UV radiation and it will block radiation in high incident angles before it block radiation in low incident angles. This means that a lightgate can be open for long visible wavelengths while it is shut for UV radiation in shorter wavelengths. When longer wavelength radiation enters a phosphor 100 layer it is diffused but not converted in wavelengths. Beneath the phosphor 100 layer a low n low n cladding 5 can be inserted. The low n low n cladding 5 will not affect radiation from the 30 less polar liquid inside the inverted droplet lightgates because the geometry of the inverted droplet will direct radiation towards the low n low n cladding 5 layer in angles below the critical angle. When UV radiation enters the phosphor 100 layer it is converted and reemitted as Lambertian radiation. At least 50% will therefore propagate upwards and of the 50% of the radiation that will propagate downwards a large proportion will be TIR reflected and re-enter the phosphor 100 layer where it will be diffused in the general direction that it has been TIR reflected of the low n low n cladding 5. The combined refractive index of the phosphors and the material containing the phosphors in the phosphor 100 layer should be as high as possible to ensure as low a critical angle between the low n low n cladding 5 and the phosphor 100 layer as this enhanced the proportion of radiation that is TIR reflected. The converted radiation backscatter from the phosphor 100 layer below the critical angle can be blocked to a great extend by inserting a multilayer interference filter designed to reflect the visible light converted by the phosphor 100 layer while allowing direct UV radiation in low angles to pass straight through such that the proportion of radiation that backscatter is limited. Backscattered radiation can be reemitted by use of mirrors below the waveguide and the mirror can for instance be placed on top of the lower protective surface 200. The light sources 20 can be side emitting LED(s) that are attached to the appendices 250 surfaces. In order to prevent loss of radiation that is not TIR reflected at the waveguide 10 edges the light source 20 can be mirrored such that radiation only will exit the edge that is directed into the appendices 250 and thus is send on a course that will ensure that the radiation circulate inside the waveguide 10. Controlling the correct angle span inside the waveguide can be done by use of diffractive structures 81. The spacer layer 220 is primarily used to ensure that the lower surface of the waveguide 10 is facing air such that a low critical angle is ensured. Secondary the spacer layer 220 provides partly support to the waveguide 10 and creates a cavity between the waveguide 10 and the protective lower layer 200. The cavity can be used for several purposes such as for containing low n liquid with high heat conductivity and good electric insulation such as the dipolar liquid 30 when all ions are removed. Inside the cavity with or without the dipolar liquid 30 electronic components such as the light sources 20 and various electronics that can comprise 2D or 3D accelerometer, light sensors, cameras, wireless communication transceiver, memory, programmable CPU etc. The purpose of the electronics is to control the colour tuning, the match between LED emission spectra and phosphor excitation spectra, the emission intensity, the spot width etc. through addressing different lightgates that connect radiation to different light modulations arrangements such as diffractive structures 81 and/or micro prisms and/or phosphor 100 layer and/or LC elements 104.

Figure 22:
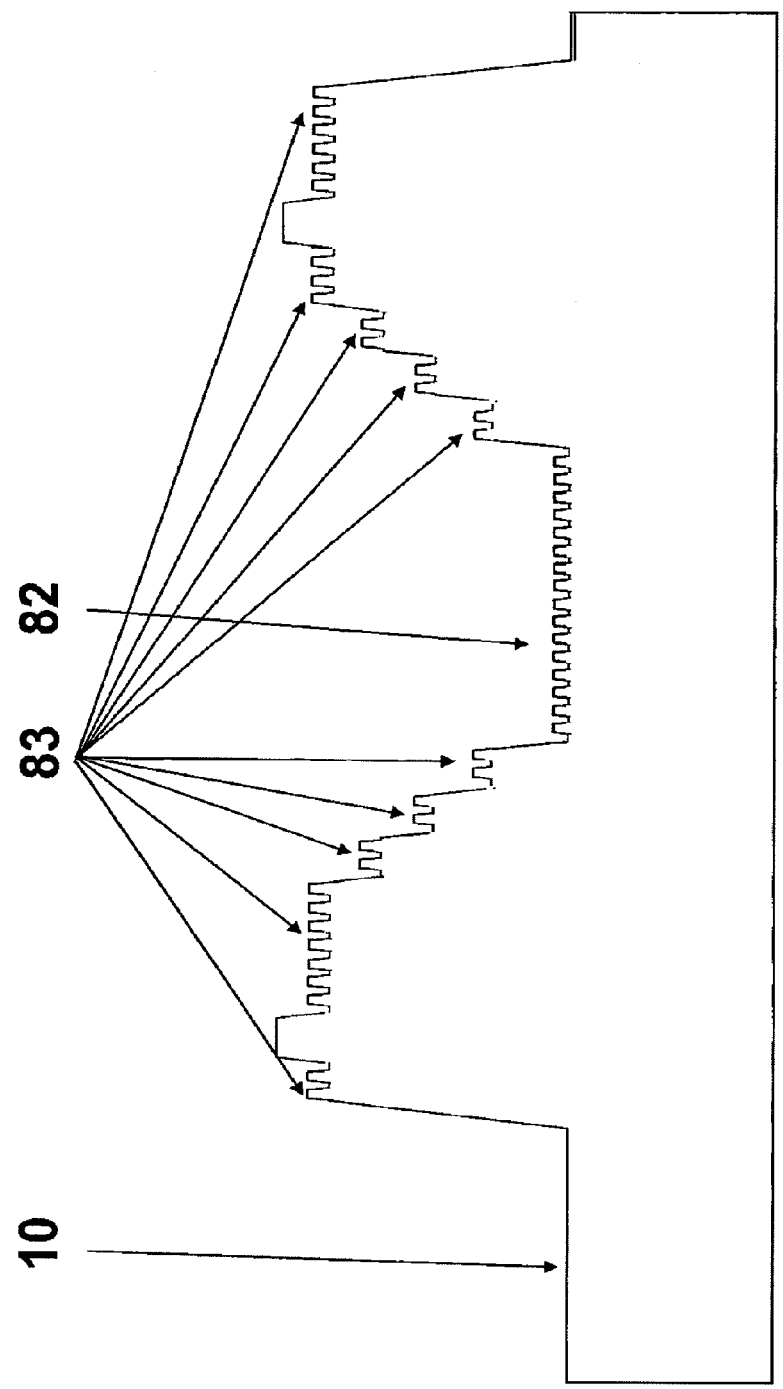
FIG. 22 shows an inverted lightgate based on topologic suspension of fluids.

FIG. 22 shows an inverted lightgate based on topologic suspension of fluids. The key idea in the inverted droplet lightgate is that radiation that enters the lightgate will be TIR reflected at the boundary between the less polar liquid 35 inside the inverted droplet and the low n dipolar liquid 30 at the outside due to the critical angle formed as a result of the difference in refractive indices. In the single sided version of the inverted droplet lightgate the droplet is not created by suspending it between two surfaces but merely by controlling the topology and distribution of dipolar liquid 30 and less polar liquid 35 via printed indents in the low n cladding 5 above the waveguide 10 that are designed with ridges, that repel the dipolar liquid 30 but attract the 25 less polar liquid, going to the bottom of the indents where the apertures 96 are situated. In between the ridges the sidewalls of the indent have surfaces that repel the less polar liquid 35 but attract the dipolar liquid 30. In between the indents the waveguide 10 surface is nanoengineered to increased affinity for the dipolar liquid 30 except for small areas that are also elevated where there is less or no affinity for the dipolar liquid 30. These elevated areas form spacer dots that are adapted to support and/or adhere to the top surface 1. The less polar liquid 35 will when it is brought in contact with the waveguide 10 surface with printed indents and nanoengineered properties connect to the areas that are nanoengineered to increased affinity for the less polar liquid 35 and the dipolar liquid 30 will adhere to the areas that is nanoengineered to have affinity for dipolar liquid 30. In the indents the less polar liquid 35 will for a droplet suspended by the ridges and the aperture 96 and surrounded at all other sides by dipolar liquid 30. The walls of the suspended droplet of less polar liquid 35 are designed to be above 90 degrees such that the radiation escaping from the waveguide 10 due to frustrated total reflection in general be TIR reflected at the boundary between less polar liquid 35 and the dipolar liquid 30 and the boundary between the less polar liquid 35 and the low n cladding 5. At the same time the angle of the droplet walls will reflect escaping radiation upwards in lower angles.

The lower electrode 41 is situated below the dielectric layer 3. The lower electrode 41 can either be a common ground or patterned with rows or columns or be part of an active matrix. The lower electrode 41 and the dielectric layer 3 can be placed on top of the low n cladding 5 and the waveguide 10 or it can be placed directly on top of the waveguide 10. If the lower electrode 41 and the dielectric layer 3 is situated on top of the waveguide 10 with low n cladding 5 on top there is a high probability that the low n cladding 5 print process leaves residual materials on top of the bottom of the indents where the apertures 96 are situated which will result in a decrease of electric field strength and will increase the risk of charge trapping. One way to handle the problem is by etching the residual material away in a process where the entire waveguide 10 with the low n cladding 5 is put through an etch process. This etch process must however not ruin the nanoengineered properties and this entails that the nanoengineered properties has to be created in a scale large enough to withstand etching without changing its desired properties. A way to achieve this is to nanoengineer one property or in some instances two properties only while the intrinsic properties to the material with the nanoengineered surfaces provide yet a desired property. Clearly this process is only applicable for surfaces before the 41 electrode and the dielectric layer 3 is applied to the top of the surfaces. In an alternative production method the lower electrode 41 and the dielectric layer 3 is applied directly to the waveguide 10 and the dielectric layer 3 is of a material that after having been etched will have a greater affinity for the less polar liquid 35 than for the dipolar liquid 30.

In some instances a primer is required to ensure that the low n cladding 5 can adhere to the waveguide 10 surface directly or the dielectric layer 3. The primer can be spin coated onto the desired surface or alternatively both the low n cladding 5 and the primer can be printed onto the desired surface by a multilayer print process where the low n cladding 5 is first supplied to the print matrix whereafter surplus low n cladding 5 is removed and the primer is then supplied to the low n cladding 5 whereafter the matrix apply both primer and the low n cladding 5 to the surface desired. Curing is preferably UV curing and the curing is preferably done while the matrix is still in contact with the desired surface. The described process can be enhanced with a material that allows safe removal of the matrix and yet a material that is better adapted to form the required nanoengineered structures. In this case the print process will deliver a multilayered print to the desired surface and the low n cladding 5 will exhibit its desired property from inside a sandwich construction. The advantage of this approach is that each of the layers in the sandwich is applied in the same print process and each enhances performance by having properties designed for the specific task.

The print matrice employed in the process can be a roll which enables fast roll to roll manufacture. For fast roll to roll manufacture it is important that the curing is equally fast and accurate which entails that the curing should take place while the print is confined within the print matrice.

The nanoengineered surface can be absorptive or diffuse reflective according to the purpose of the electrowetting unit. For illumination purposes it will usually be valuable to reflect impinging photons while it for display applications can be more valuable to be absorptive to enhance blacklevel.

In order to secure the distribution of less polar liquid 35 and dipolar liquid 30 inside the electrowetting unit, the top surface 1 underside has an affinity for the 30 less polar liquid.

The 30 less polar liquid can be engineered to become more electric conductive by additives such as carbon nanotubes or metallic ions. With conductive 30 less polar liquid the electric field strength can be increased and the voltage required can be lowered.

As there is oil at the lower side of the top surface 1 the upper electrode 25 can be in direct galvanic contact with the oil with little risk of exposure to oxygen. This protected position for the upper electrode 25 can be utilized to place an active matrix on the under side of the top surface 1. An active matrix can have a print that could be oil based that repel dipolar liquid 30 and enhances affinity for less polar liquid 35 and form an oxygen barrier and act as an insulator. The insulating print could in conjunction with a conductive print in patterns define where the electric interaction between the less polar liquid 35 with conductive properties takes place. Active matrix based on polyamorph silicon or crystalline silicon is able to withstand exposure to oxygen while cheaper printed electronics active matrix is made from materials that are unable to withstand exposure to oxygen for a prolonged period without degradation. The print and oil layer that protect the active matrix can prolong the lifetime before a printed active matrix succumb to the oxygen exposure. Radiation from the waveguide 10 exit through the top surface 1 and if there is an active matrix situated at the lower top surface 1 then it should be partially transmissive. Transistors and other elements in circuitry needed for active matrix are available in transparent version.

An entire electrowetting unit based on printed electronics is therefore feasible.

Electric control of the lightgates is done by employing a potential difference which change the aperture 96 areas from an affinity for less polar liquid 35 to an affinity for dipolar liquid 30 which shut the lightgate due to the low n property of the dipolar liquid 30 and by aligning the potential which will allow the aperture 96 area to exhibit its affinity for less polar liquid 35 and thus create index match between the waveguide 10 and the less polar liquid 35.

In an embodiment with active matrix as well as with active rows or columns there will be crosstalk but it will be limited as a result of the low conductivity of the less polar liquid 35 and the mush thinner and longer connection in the vertical plane relative to the more direct connection through the inverted droplet to the aperture 96 area. The crosstalk between a shut lightgate to an adjacent open lightgate will be below a level where the aperture 96 area switch affinity to dipolar liquid 30 which ensures that even though there will be crosstalk the crosstalk is insufficient to cause problems with controlling open and shut states.

The invention claimed is:

1. A radiation emitting element comprising:
a radiation transmissive element having a first refractive index, a first surface and a second, opposite surface;
a radiation emitter adapted to emit radiation of a first wavelength into the radiation transmissive element; and
a plurality of radiation controlling elements, wherein each radiation controlling element comprises,
a first liquid having a second refractive index, the first liquid having a transmittance of at least 10% at the first wavelength,
a second fluid having a third refractive index being lower than the second refractive index, the second refractive index being closer to the first refractive index than the third refractive index,
a covering element abutting the first surface, being positioned adjacent to a first surface part of the first surface, having a fourth refractive index being lower than the first refractive index and supporting Total Internal Reflection (TIR) transport of the radiation within the transmissive element, and being transmissive to the radiation, and
a means for altering a shape of the first liquid between two modes wherein,
in a first mode, the first liquid being in contact with the first surface at the first surface part, and an interface between the first liquid and the second fluid, at the first surface part, is not parallel to the first surface part, and
in a second mode, a surface of the second fluid, at the first surface part, is at least substantially parallel to the first surface part, and at least part of the first liquid overlaps the covering element.

2. The element according to claim 1, further comprising: optical elements being arranged for directing radiation being emitted from the radiation controlling elements toward a single position or a single user.

3. The element according to claim 1, further comprising: a display element comprising a plurality of intensity controlling elements each adapted to receive radiation from the radiation controlling elements and output radiation with a predetermined intensity.

4. The element according to claim 3, wherein the display element is an array of LC elements each positioned in front of a radiation controlling element for controlling the intensity of radiation thereby.

5. The element according to claim 1, further comprising:
a plurality of radiation converting means each being adapted to receive and convert radiation emitted from one or more radiation controlling elements to radiation of one or more wavelengths different from the first wavelength.

6. The element according to claim 5, further comprising: optical elements being arranged for directing radiation being emitted from the radiation converting means toward a single position or a single user.

7. The element according to claim 5, further comprising:
a display element comprising a plurality of intensity controlling elements each adapted to receive radiation from the radiation converting means and output radiation with a predetermined intensity.

8. The element according to claim 1, wherein an upper cladding layer is provided at or on top of the upper second surface of the radiation transmissive element, said upper cladding layer having a refractive index being lower than the first refractive index.

9. The element according to claim 8, wherein a beam shaping optics layer is provided above or on top of the upper cladding layer.

10. The element according to claim 9, wherein the beam shaping optics layer is a prism sheet or a diffractive optical element.

11. The element according to claim 8, wherein a first part of the beam shaping optics layer directs emission to the left and a second part of the beam shaping optics layer directs emission to the right.

12. The element according to claim 8, wherein an array of LC elements is arranged above the optics layer.

13. The element according to claim 1, wherein a phosphor layer is placed above or on top of the upper cladding layer.

14. The element according to claim 13, wherein a beam shaping optics layer is provided above or on top of the phosphor layer.

15. The element according to claim 13, wherein the beam shaping optics layer is a prism sheet or a diffractive optical element.

16. The element according to claim 13, wherein the beam shaping optics layer controls where the light from a particular area of the phosphor layer is directed.

17. The element according to claim 16, wherein a first part of the beam shaping optics layer directs emission to the left and a second part of the beam shaping optics layer directs emission to the right.

18. The element according to claim 16, wherein an array of LC elements is arranged above the optics layer.

19. The element according to claim 1, wherein the radiation emitter comprises a plurality of radiation emitters and a controlling means adapted to control the individual radiation emitters to emit radiation into the radiation transmissive element sequentially in time.

20. The element according to claim 19, wherein the radiation emitter is adapted to emit visible light of different colours into the transmissive element sequentially in time.

21. The element according to claim 1, wherein the altering means of at least one radiation controlling element is adapted to move at least all of the first liquid to the first surface part in the first mode and away from the first surface part in the second mode.

22. The element according to claim 1, wherein at least one of the radiation controlling elements is bistable so that altering between the first and second modes requires feeding an electrical signal by the altering means and each of the first and second modes is maintained when the electrical signal is not provided.

23. The element according to claim 1, wherein the altering means are adapted to, in the second mode, have substantially all of the liquid overlap the covering element.

24. The element according to claim 1, further comprising:
a backing element extending along the first surface and delimiting a space in which the first liquid and the second fluid of all controlling elements are positioned, the space being further delimited by a viscous liquid extending between the first surface and the backing element along a closed curve encircling the radiation controlling elements.

25. The element according to claim 1, wherein the covering element comprises a structure or refractive index changes adapted to direct the radiation more across the transmissive element to further enhance out coupling of this radiation.

26. The element according to claim 1, wherein the first mode is an open mode, and the second mode is a closed mode.

27. The element according to claim 1, wherein, in the first mode, radiation is re-directed by the interface between the first liquid and the second fluid.

28. The element according to claim 1, wherein, in the first mode, radiation will travel into the first liquid and interact with the interface between the second fluid and the first liquid, whereby the radiation will be directed into another angle than that at which the individual photons arrived at.

29. The element according to claim 1, wherein the first surface part is a local area in which radiation, formerly transported in the transmissive element by TIR, may be provided with a different angle which will make the radiation escape the transmissive element when re-introduced therein by the action of the interface.

30. A display comprising a plurality of elements according to claim 1, wherein the display is a holographic display.

* * * * *